United States Patent
Saeki

Patent Number: 5,969,772
Date of Patent: Oct. 19, 1999

[54] DETECTION OF MOVING OBJECTS IN VIDEO DATA BY BLOCK MATCHING TO DERIVE A REGION MOTION VECTOR

[75] Inventor: Takayuki Saeki, Tokyo, Japan

[73] Assignee: NEC Corporation, Tokyo, Japan

[21] Appl. No.: 08/961,271

[22] Filed: Oct. 30, 1997

[51] Int. Cl.$^6$ .................................................. H04N 7/36
[52] U.S. Cl. ........................ 348/699; 348/402; 348/416; 382/236; 382/243
[58] Field of Search .................................. 348/699, 700, 348/402, 407, 413, 416, 431; 382/236, 243; H04N 7/36

[56] References Cited

U.S. PATENT DOCUMENTS

| | | | |
|---|---|---|---|
| 5,673,339 | 9/1997 | Lee | 382/236 |
| 5,731,840 | 3/1998 | Kikuchi | 348/416 |
| 5,742,289 | 4/1998 | Naylor | 348/402 |
| 5,799,109 | 8/1998 | Chung | 382/243 |

FOREIGN PATENT DOCUMENTS

| | | |
|---|---|---|
| 2-278479 | 11/1990 | Japan . |
| 7-38842 | 2/1995 | Japan . |

OTHER PUBLICATIONS

Ueda et al., "Automatic Object Linkage by Video Analysis and it's Application", 1993 Spring General Meeting of the Electronic Information and Communication Institute of Japan, Paper No. SD–9–1, pp. 7–415–7–416.

Akio Shio et al., "Segmentation of People in Motion", *Konpyuta Bizyon* (*Computer Vision*), 75–5, Nov. 22, 1991, pp. 1–8.

*Primary Examiner*—Howard Britton
*Attorney, Agent, or Firm*—Sughrue, Mion, Zinn, Macpeak & Seas, PLLC

[57] ABSTRACT

In a video analysis device, a frame separator separates from frame images respresentative of a moving object at least first and second key frames based on either a scene change or a great movement of the object. Responsive to color and edge information, a region divider divides each key frame into region data. A vector detector applies block matching to the key frames to detect block motion vectors and detects in response to the region data of the first key frame a plurality of region motion vectors. Responsive to the region data and the region motion vectors, a correspondence establishing unit establishes correspondence between one of the region data of the first key frame and the region data of the second key frame to identify the object.

29 Claims, 22 Drawing Sheets

DETECTION OF MOVING OBJECTS IN VIDEO DATA BY BLOCK MATCHING TO DERIVE A REGION MOTION VECTOR

BACKGROUND OF THE INVENTION

This invention relates to a video analysis method and a video analysis device for analyzing a succession of video data or images to detect a plurality of moving objects, such as up to about fifty moving objects which are moving in the video data.

Such a video analysis device is used in a monitoring system for automatically recognizing moving vehicles and walking persons. For example, a method of detecting walking persons in a cinematic sequence of frames is described by Akio Shio and Jack Sklansky in "Konpyûtâ Bizyon" (Computer Vision), 75-5, (1991-11-22, eight pages) as an article in the Japanese Language with an English title of "Segmentation of People in Motion" and an Abstract in English. In this video analysis method, a background image is first obtained from frame images of the sequence to extract at least two region images. By a block matching technique, motion vectors are detected in the region images. Assuming that region images of similar motion vectors represent a moving object with a high probability degree, the region images are divided into regions of walking persons.

The video analysis is recently used in editing motion video images. An example is described in a paper contributed by Hirotaka Ueda and two others to the 1993 Spring General Meeting of the Electronic Information and Communication Institute of Japan, Paper No. SD-9-1, under the English title of "Automatic Object Linkage by Video Analysis and its Application" as translated by the contributors. According to this paper, a user first specifies an object in one of successive frames. A video analysis device detects objects of identical color combinations automatically in other frames to form a hyperlink.

The technique of the Shio et al article aims at correct detection of the regions of walking persons and an accurate follow of these regions. For this purpose, it takes much time to deal with the frame images of the cinematic sequence. In order to process the frame images at a high speed, it is necessary in most cases to use specific image processing hardware.

The technique of the Ueda et al paper is featured by simple processing. This technique is, however, liable to occurrence of errors and gives results of an objectionable precision. This is because no consideration is taken on correspondence between each moving object and successive frame data.

SUMMARY OF THE INVENTION

It is consequently an object of the present invention to provide a video analysis method of analyzing a succession of video data to identify correctly and at a high speed without use of specific image processing hardware a moving object included in the video data.

It is another object of this invention to provide a video analysis method which is of the type described and which can additionally detect a velocity of the moving object.

It is still another object of this invention to provide a video analysis method which is of the type described and which can follow the moving object through a certain number of the video data.

It is yet another object of this invention to provide a video analysis method which is of the type described and which is applicable to edition of the video data.

It is a different object of this invention to provide a video analysis device for implementing the video analysis method of the type described.

Other objects of this invention will become clear as the description proceeds.

In accordance with an aspect of this invention, there is provided a video analysis method comprising the steps of (a) separating from a succession of video data two key frames representative of a moving object, (b) forming a predetermined number of region data in a first key frame of the two key frames, (c) detecting in response to the region data a region motion vector in the first key frame relative to a second key frame of the two key frames, and (d) establishing a correspondence between the region motion vector and the region data to identify the moving object.

In accordance with a different aspect of this invention, there is provided a video analysis device comprising (a) separating means for separating from a succession of video data two key frames representative of a moving object, (b) forming means for forming a predetermined number of region data in a first key frame of the two key frames, (c) detecting means responsive to the region data for detecting a region motion vector in the first key frame relative to a second key frame of the two key frames, and (d) establishing means for establishing a correspondence between the region motion vector and the region data to identify the moving object.

DETAILED DESCRIPTION OF EMBODIMENTS

Figure 1:
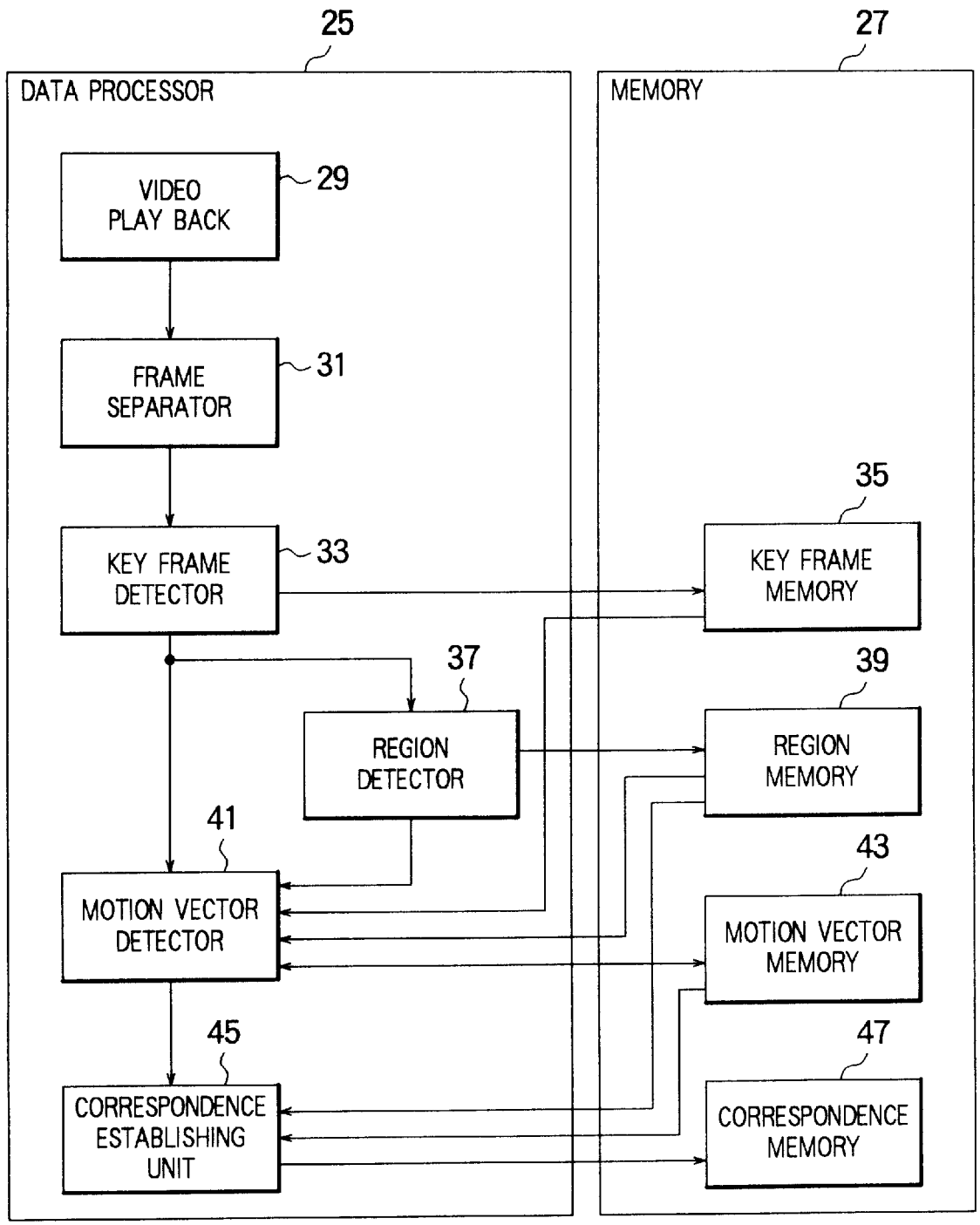
FIG. 1 is a block diagram of a video analysis device according to a first embodiment of the instant invention.

Referring to FIG. 1, the description will begin with a video analysis device according to a first preferred embodiment of the present invention. The video analysis device consists of a program operable data processing device 25 for processing various information and a memory device 27 for storing the information as stored information and for supplying the stored information to the data processing device 25.

The data processing device comprises a video play back unit 29 for reproducing a succession of video data from a record of the video data. The succession of video data represents at least one moving object. The video play back unit 29 may be a video device reproducing the succession of video data. From the video data, a frame separating unit 31 successively picks up individual frame images of still digital videos. Connected to the frame separating unit 31, a key frame detecting unit 33 detects either a change in color histogram or a frame difference between two consecutive ones of the frame images and thereby either a scene change or a sudden change in the consecutive frame images with reference to a predetermined threshold value. When the succession of video data is monochromatic, the color histogram is a histogram of achromatic colors. Responsive to the scene change or the sudden change, the key frame detector 33 picks up at least two key frames from the successively picked up frame images and stores the key frames in a key frame memory unit 35 of the memory device 27 as stored key frames. Use of the frame difference together with the change in color histogram makes it possible to correctly detect the sudden change even when the change in color histogram is little.

Connected to the key frame detecting unit 33, a region detecting unit 37 detects color and edge information of a first key frame of the at least two key frames that may be a first picked up one of the key frames. Based on the color and edge information, the region detecting unit 37 forms a predetermined number of region data which will presently be exemplified. Thus formed region data are stored in a region memory unit 39 of the memory device 27 as stored data.

Connected to the key frame detecting unit 33, the key frame memory 35, the region detecting unit 37, and the region memory unit 39, a region motion vector detecting unit 41 is supplied first with the first key frame from the key frame memory unit 35 and a second key frame of the at least two key frames preferably directly from the key frame detector 33 and later with the stored data from the region memory unit 39 to detect a region motion vector related to at least one of the region data which are produced by the region detecting unit 37 and stored as the stored data in the region memory unit 39. The second key frame is one of the at least two key frames that is picked up preferably next following the fist key frame. The motion vector detecting unit 41 stores the region motion vector in a motion vector memory unit 43 of the memory device 27 as a stored vector.

Connected to the region memory unit 39, the motion vector detecting unit 41, and the motion vector memory unit 43, a correspondence establishing unit 45 is first supplied with the region motion vector detected by the motion vector detecting unit 41, the stored data, and the second key frame to establish a correspondence between the first and the second key frames to identify the moving object. The correspondence establishing unit 45 stores such correspondences in a correspondence memory unit 47 of the memory device 27 as stored correspondences.

In the manner described in the foregoing, the video analysis device of FIG. 1 detects a plurality of moving objects in the succession of video data. The moving objects are stored as the correspondences in the correspondence memory unit 47 in connection with the moving objects, respectively. The velocity of each moving object is calculated by using the stored data of the motion vector memory unit 43 and a time interval between two consecutive ones of the at least two frames stored as the stored key frames in the key frame memory unit 35. It is therefore possible to use the information stored in the memory device 27 in editing the video data as desired.

In FIG. 1, direct connection makes it possible to start detection of the region motion vector at an instant of separation of the second key frame. Similar merits are achieved by direct connection between the motion vector detecting unit 41 and the correspondence establishing unit 45.

Figure 2:
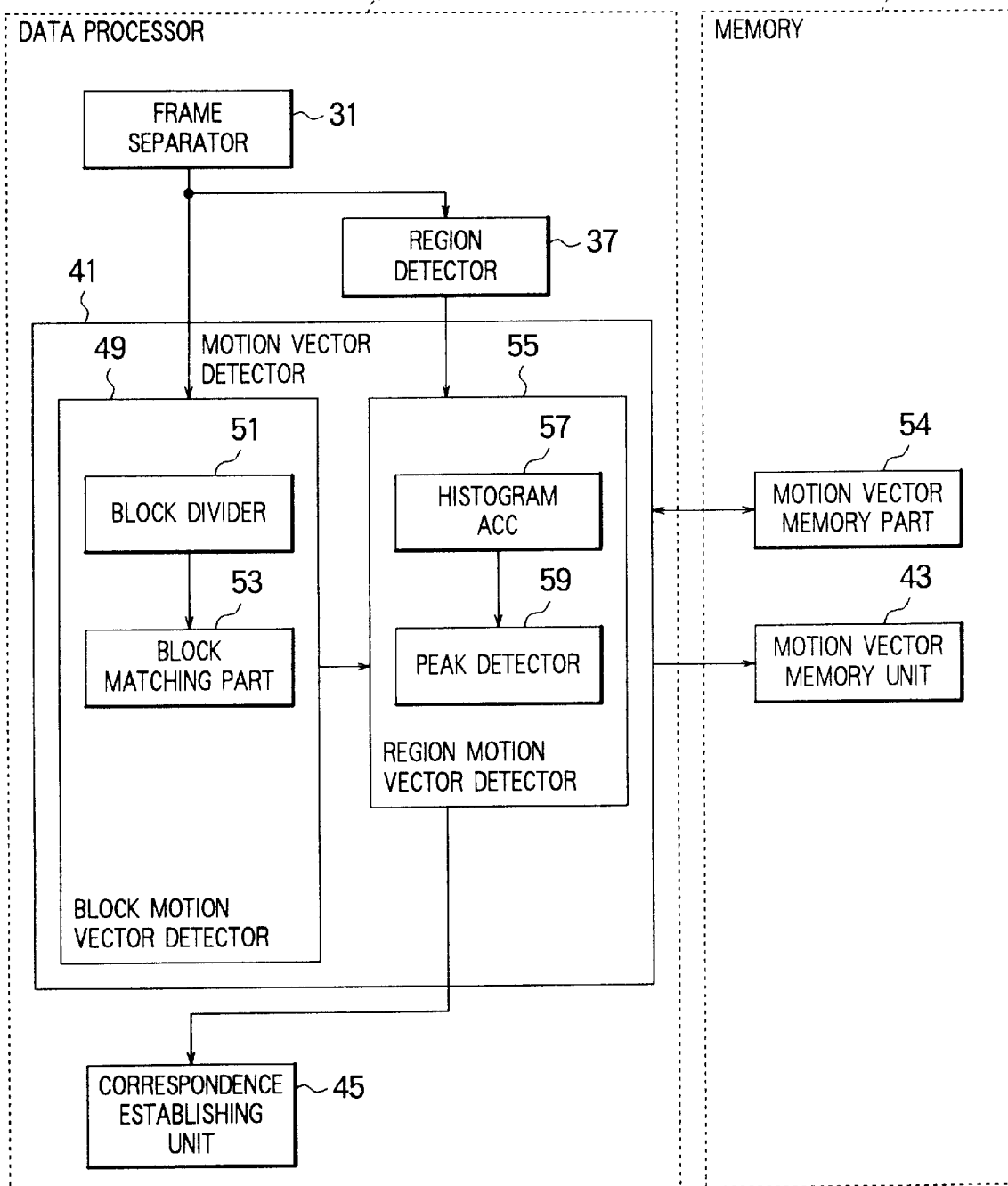
FIG. 2 is a block diagram of the video analysis device depicted in FIG. 1, illustrating its motion vector detecting unit in detail.

Turning to FIG. 2, the region motion vector detecting unit 41 of FIG. 1 will be described more in detail. It should be noted that other related parts of the video analysis device of FIG. 1 are again illustrated in FIG. 2. Furthermore, it should be noted throughout the following that similar parts are designated by like reference numerals and are similarly operable with likewise named signals.

The motion vector detecting unit 41 comprises a block motion vector detecting part 49 which comprises in turn a block divider 51. Connected to the key frame memory unit 35, the block divider 51 divides the first key frame into a plurality of blocks which are identical with the region data. In the block motion vector detecting part 49, a block matching part 53 is connected to the key frame memory unit 35 of FIG. 1, is supplied with the second key frame, and produces by a block matching technique a plurality of block motion vectors between a certain number of the blocks and corresponding areas in the second key frame. For this purpose, each block is compared with adjacent areas of the second key frame as regards changes in colors. If found to have a least color change, one of the adjacent areas is selected as a corresponding area of the block under consideration. That is, the block is understood to have moved to the corresponding area. The block motion vector is defined according to the block matching technique by a vector drawn in the first key frame from the block in question to its area corresponding to the corresponding area. The block matching part 53 stores such block motion vectors successively in a motion vector memory part 54.

The motion vector detecting unit 41 further comprises a region motion vector detecting part 55 which comprises in turn a histogram forming part 57. Connected to the region detecting unit 37, the block matching part 53, and the motion vector memory part 54, the histogram forming part 57 accumulates into a histogram, in connection with each region datum of the first key frame, the block motion vectors from the motion vector memory part 54. One of the block motion vectors is preferably supplied from the block matching part 53 that is produced latest among the block motion vectors. In the region motion vector detecting part 55, a peak detector 59 is connected to the histogram forming part 57 to detect, as the region motion vector of the block datum in question, a peak motion vector that most frequently appears in the histogram. Such region motion vectors are stored in the motion vector memory unit 43 and delivered to the correspondence establishing unit 45.

It is possible to use the block divider 51 also in dividing the second key frame to the blocks. In this event, the block matching part 53 applies the block matching technique between each block of the first key frame and adjacent blocks in the second key frame.

Figure 3:
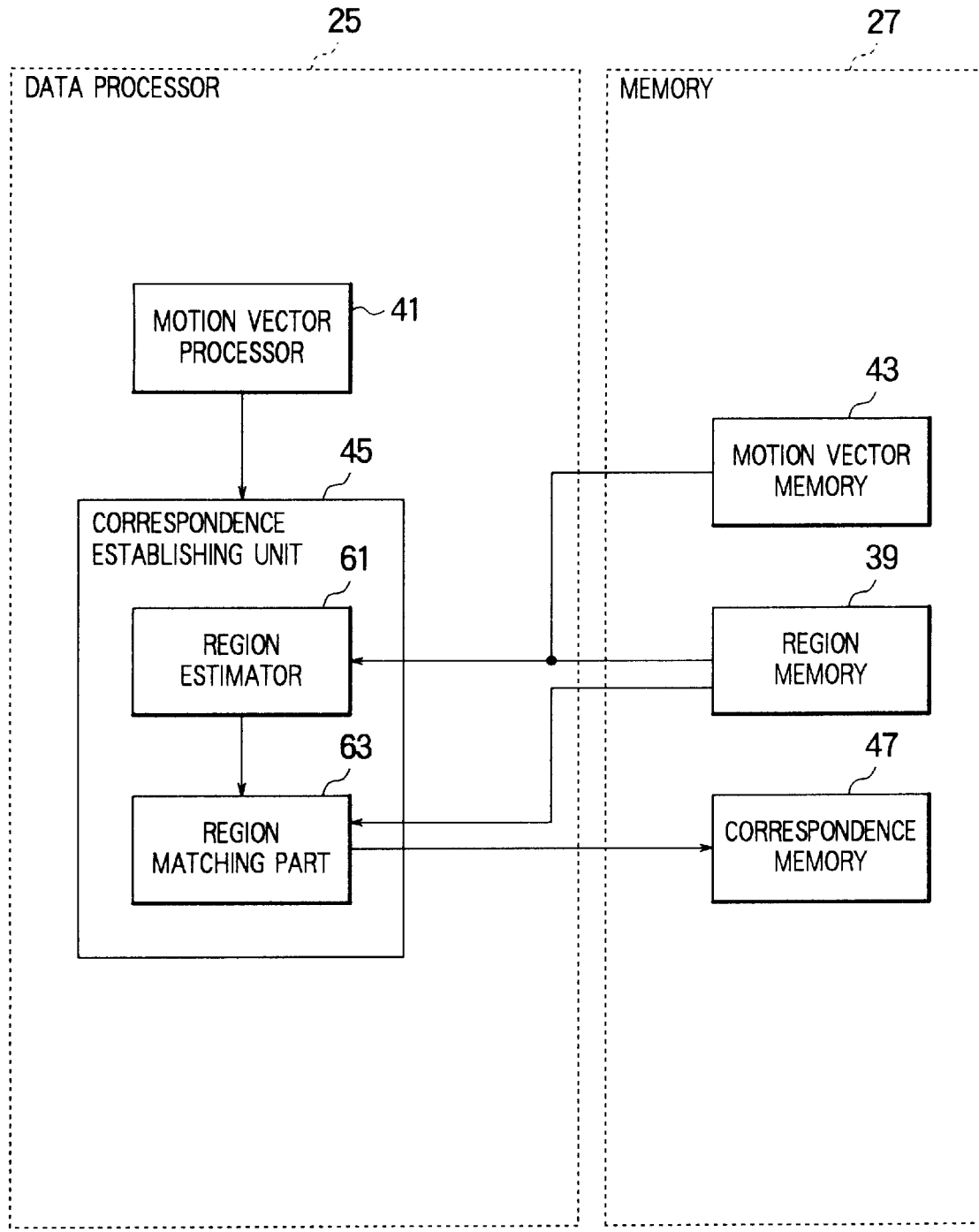
FIG. 3 is a block diagram of the video analysis device of FIG. 1 with its correspondence establishing unit illustrated in detail.

Further turning to FIG. 3, the correspondence establishing unit 45 comprises a region estimating part 61 and a corresponding region matching part 63. Connected to the motion vector detecting unit 41 and the motion vector memory unit 43, the region estimating part 61 calculates for each region datum formed in the first key frame and with the region motion vector of this region datum an estimated datum to which the region datum under consideration would move at the instant of separation of the second key frame. It is now assumed that the region data are formed and stored in the region memory unit 39. Connected to the region memory unit 39 and the region estimating part 61, the region matching part 63 checks a manner of superposition of the estimated datum on each region datum formed in the second key frame to identify as representing the moving object one of the region data formed in the second frame that can be superposed on the estimated datum at a widest area. It is now assumed that the frame images or data of the succession are given frame numbers and that the region data of each key frame are given region ID numbers. The region matching part 63 stores as the correspondences the frame numbers of the first and the second key frames and the region ID numbers of the region data which are formed in the first and the second key frames, respectively, and between which the correspondence is established.

Figure 4:
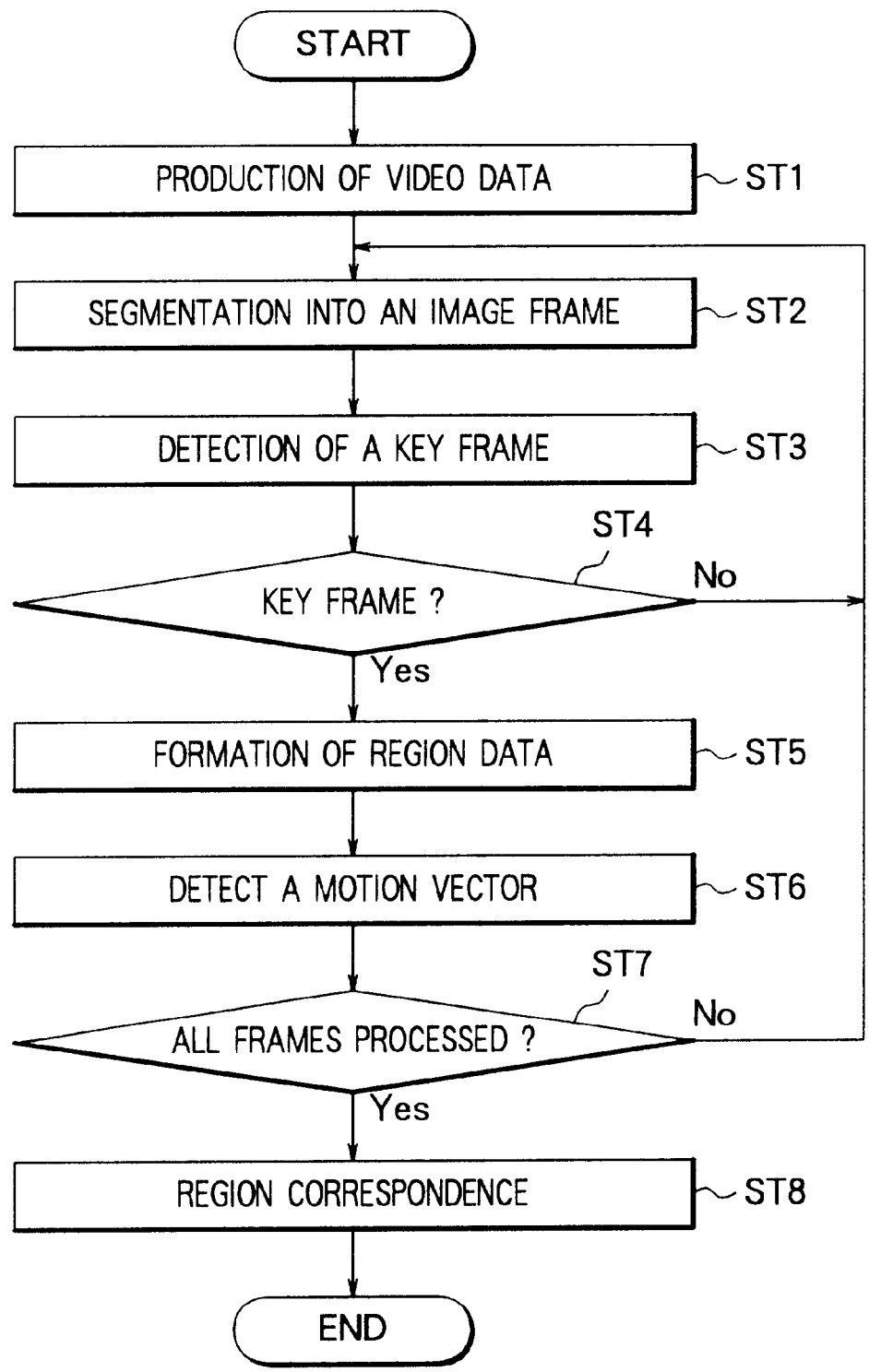
FIG. 4 shows a flow chart for use in describing operation of the video analysis device illustrated in FIG. 1.

Referring afresh to FIG. 4 and again to FIG. 1, operation will be summarized as regards the video analysis device illustrated with reference to FIG. 1. Upon START of the video analysis device, the video play back unit 29 produces the video data of the succession at a first primary step ST1. The frame separating unit 31 segments an image frame from the video data at a second primary step ST2.

The key frame detecting unit 33 detects a key frame at a third primary step ST3 in consideration of the color change and/or the frame difference and judges as regards this key frame at a fourth primary step ST4 whether or not each of such frames is a key frame with reference to the threshold value. If the frame being checked is not the key frame, the fourth primary step ST4 returns to the second primary step ST2.

If the frame under check is confirmed at the fourth primary step ST4 as the key frame, the region detecting unit 37 forms the region data in the first key frame at a fifth primary step ST5. The motion vector detecting unit 41 successively detects the region motion vector at a sixth primary step ST6 in the first key frame with reference to the second key frame.

The motion vector detecting unit 41 subsequently checks at a seventh primary step ST7 whether or not all image frames are already processed. If even an image frame remains unprocessed, the seventh primary step ST7 returns to the second primary step ST2. If all image frames are already processed, the seventh primary step ST7 proceeds to an eighth primary step ST8 at which the correspondence establishing unit 45 establishes the correspondence to identify each moving object. The operation comes to an END.

Figure 5:
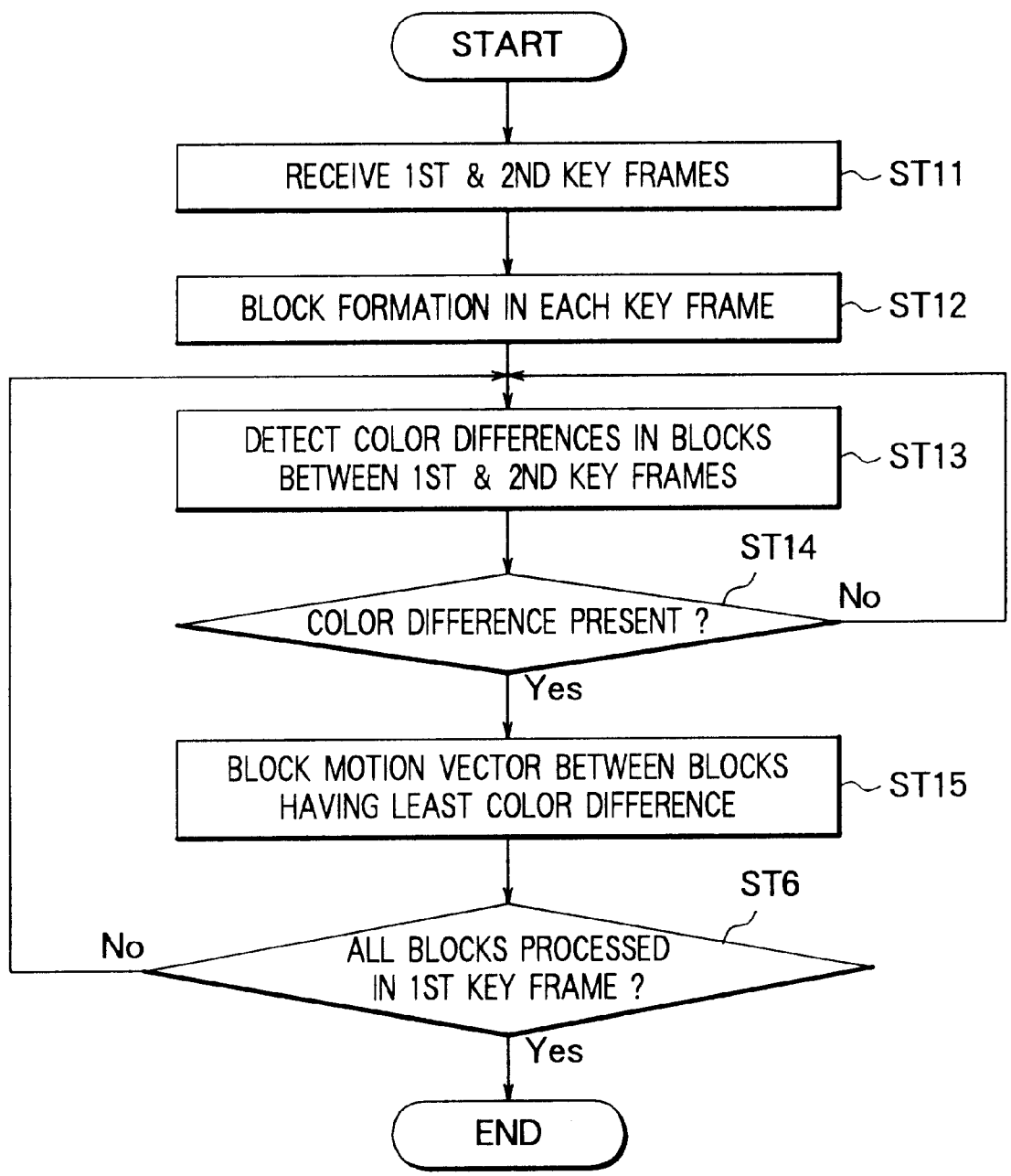
FIG. 5 shows a flow chart for use in describing operation of a block motion vector detecting part depicted in FIG. 2.

Turning to FIG. 5, operation will be described as regards the motion vector detecting unit 41 depicted in FIG. 2, namely, as regards the sixth primary step ST6. In FIG. 5, the operation is of the block motion vector detecting part 49. It should be noted during a short while in the following that the steps will be counted with some step numbers omitted merely for convenience of the description.

At an eleventh primary step ST11, the block divider 51 is supplied with the first key frame from the key frame memory unit 35 depicted in FIG. 1 and the second key frame directly from the key frame separating unit 31 and divides at a twelfth primary step ST12 each of the first and the second key frames into the blocks. The block matching part 53 detects at a thirteenth primary step ST13 the color difference between one of the blocks of the first key frame and adjacent ones of the blocks in the second key frame and checks at a fourteenth step ST14 whether or not such adjacent blocks have the color difference. If the color difference is absent, the fourteenth primary step ST14 returns to the thirteenth primary step ST13 to detect the color difference between a next one of the blocks of the first key frame and the blocks adjacent in the second key frame to the different one of the blocks.

If the color difference is found at the fourteenth primary step ST14, the block matching part 53 detects at a fifteenth primary step ST15 the block motion vector as a displacement from the one block under consideration in the first key frame to one of the adjacent blocks that has a least color difference in the second key frame. Subsequently, the block matching part 53 checks at a sixteenth primary step ST16 whether or not all blocks are already processed in the first key frame. If all blocks of the first key frame are not yet dealt with, the sixteenth primary step ST16 returns to the thirteenth primary step ST13. If all blocks are already processed, the operation comes to an END.

Figure 6:
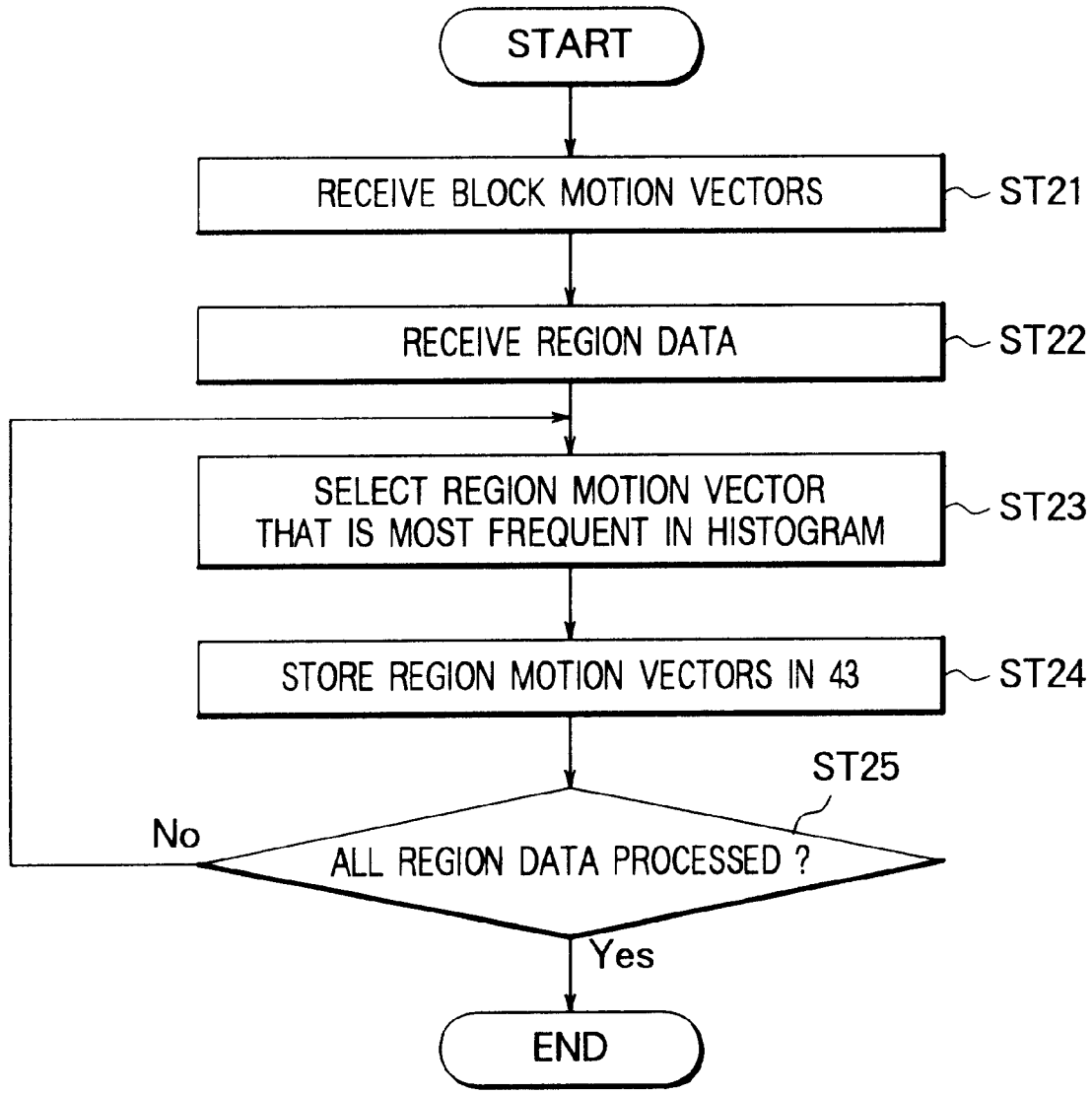
FIG. 6 shows a flow chart for use in describing operation of a region motion vector detecting part depicted in FIG. 2.

Further turning to FIG. 6, operation of the motion vector detecting unit 41 will be continued as regards the region motion vector detecting part 55 of FIG. 2. At a twenty-first primary step ST21, the histogram forming part 57 is supplied with the block motion vectors successively from the block matching part 53 and at a twenty-second primary step ST22 with the region data of the first key frame. Based on such information, the histogram forming part 57 accumulates in one region datum of the region data the block motion vectors to form the histogram at a twenty-third primary step ST23. The peak detector 59 detects at the twenty-third primary step ST23 as one region motion vector of this one region datum one of the block motion vectors that most frequently appears in the histogram. The peak detector 59 stores the region motion vector in the motion vector memory unit 43 at a twenty-fourth primary step ST24 and then checks at a twenty-fifth primary step ST25 whether or not all region data are processed. If all region data are not yet processed, the twenty-fifth primary step ST25 returns to the twenty-third primary step ST23. If all region data are already dealt with, the operation comes to an END.

Figure 7:
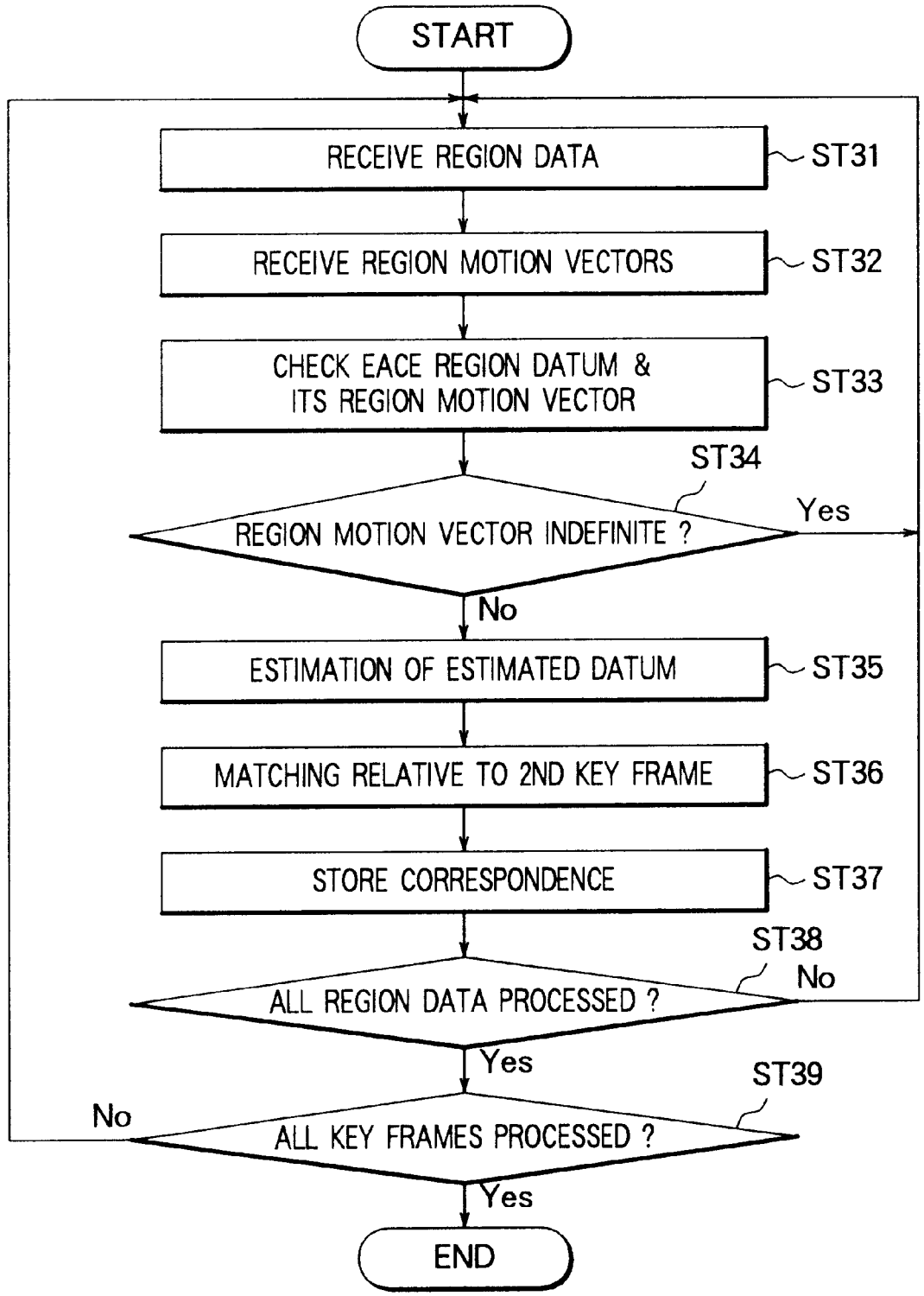
FIG. 7 shows a flow chart for use in describing operation of the correspondence establishing unit depicted in FIG. 3.

Still further turning to FIG. 7, the description will proceed to operation of the correspondence establishing unit 45 described in conjunction with FIG. 3. At a thirty-first primary step ST31 the region estimating part 61 is supplied from the region memory unit 39 with the region data of the first key frame and at a thirty-second primary step ST32 with the region motion vectors from the motion vector memory unit 43. When a last one of the region data delivered thereto and to the motion vector memory unit 43 from the peak detector 59 depicted in FIG. 2. At a thirty-third primary step ST33, the region estimating part 61 picks up each region datum and its region motion vector and checks at a thirty-fourth primary step ST34 whether or not this region motion vector is indefinite or ineffective. If the region motion vector is indefinite, the thirty-fourth primary step ST34 is turned back to the thirty-third primary step ST33 as indicated by a return to the thirty-first primary step ST31.

If the region motion vector is definite, the region estimating part 61 estimates the estimated datum at a thirty-fifth primary step ST35. At a thirty-sixth primary step ST36, the corresponding region matching part 63 detects the correspondence and stores at a thirty-seventh primary step ST37 the frame numbers and the region ID numbers in the correspondence memory unit 47. Subsequently, the region matching part 63 checks at a thirty-eighth primary step ST38 whether or not all region data are already dealt with. If all region data are not yet processed, the thirty-third primary step ST33 or the thirty-first primary step ST31 is again processed until all region data are processed. If the key frame separating unit 31 of FIG. 1 picks up at least a third key frame, the region matching unit 63 furthermore checks at a thirty-ninth primary step ST39 whether or not the correspondence is processed in connection with the second and the third key frames. If this establishment of the correspondence is not yet completed, the thirty-first primary step ST31 is again processed until the correspondence is eventually established between a penultimate and an ultimate key frame picked up by the key frame detecting unit 31. After completion of the thirty-ninth primary step ST39, the operation comes to an END.

Figure 8:
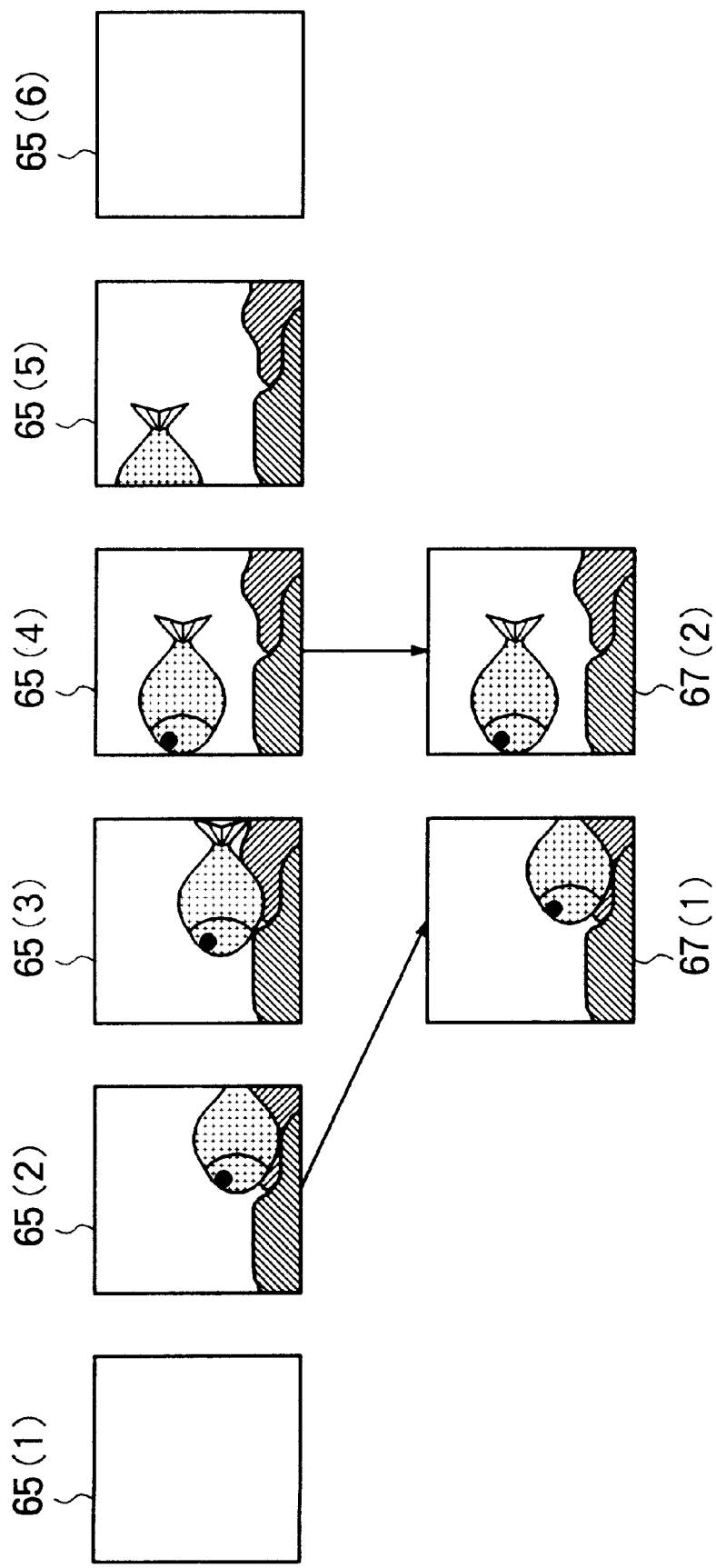
FIGS. 8 to 10 are diagrams for use in describing operation of the video analysis device illustrated in FIGS. 1 to 3.

Referring now to FIG. 8 and to FIGS. 1 to 3, operation of the video analysis device will be described in connection with detection of the moving object in the video data of the succession. As an example, a fish is used as the moving object and is schematically depicted.

In the manner illustrated along an upper row in FIG. 8, first to sixth frame images 65(1) to 65(6) are consecutively picked up by the frame separating unit 31. It is assumed that a screen change first appears between the first frame image 65(1) and the second frame image 65(2). The moving object successively moves from right to left and disappears from the frame in the sixth frame image 65(6). While the fourth frame image 65(4) is shown, the key frame detecting unit 33 picks up the third frame image 65(3) as a first key frame 67(1) and the fourth frame image as a second key frame 67(2) by detecting a frame difference greater than a difference threshold.

Figure 9:
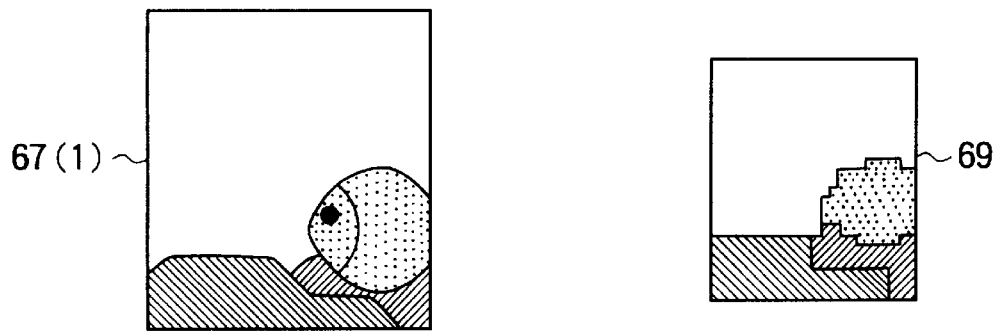

Turning to FIG. 9 with FIGS. 1 to 3 continuously referred to, the first key frame 67(1) is again depicted on a left-hand side. It is assumed that the key frame detecting unit 33 samples each key frame as a frame of 96×96 picture elements. Based on the first and the second key frames 67(1) and 67(2), the region detecting unit 35 forms first and second region data arrangements, each composed of 24×24 region data. In FIG. 9, the first region data arrangement alone is depicted on a right-hand side at 69 with the region data arrangement 69 depicted in a reduced area.

Figure 10:
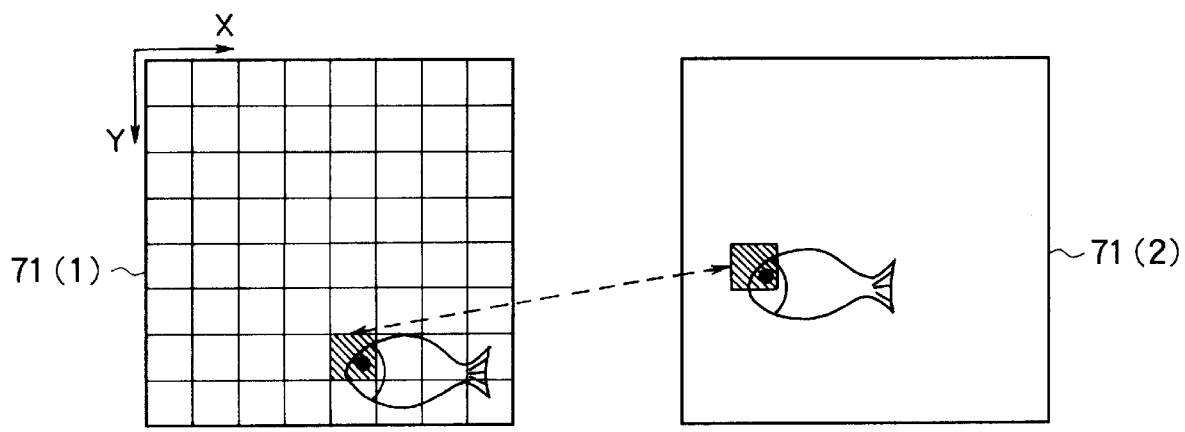
Figure 10:
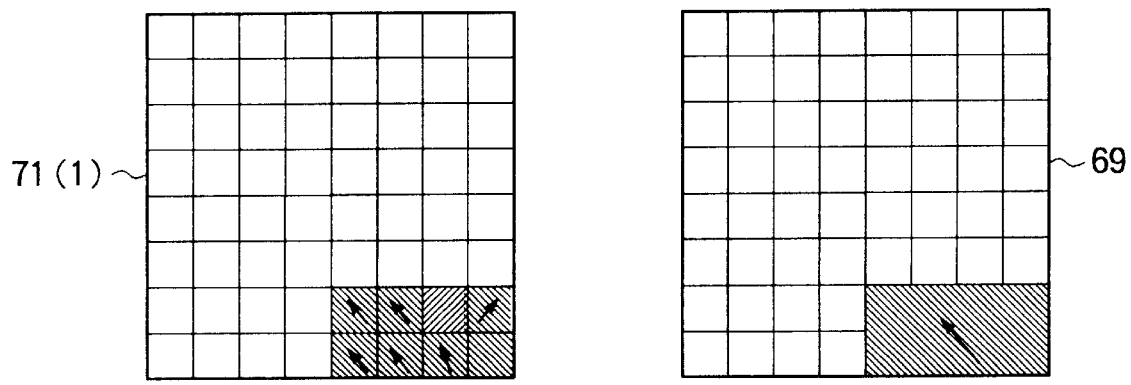

Further turning to FIG. 10 with FIGS. 1 to 3 and 9 continuously referred to, the block divider 51 of the motion vector detecting unit 41 divides the first and the second key frames 67(1) and 67(2) into the blocks of first and second block arrangements 71(1) and 71(2) depicted along an upper row. Each block arrangement consists of 24×24 blocks, equal in number to the region data, each block consisting of four by four picture elements. Such blocks are shown only in the first block arrangement 71(1) with the number of blocks reduced to an eight by eight arrangement merely for clarity of illustration. Incidentally, the fish is illustrated in such block arrangements 71(1) and 71(2) merely for convenience of the description with its background omitted and with a little displacement relative to that depicted in the first and the second key frames 67(1) and 67(2) of FIGS. 8 and 9. It should be mentioned here that the region ID numbers described before in conjunction with FIG. 3 are decided in an x-y coordinate fashion with the x and the y axes depicted along the block data of the first block arrangement 71(1) with their positive senses indicated by arrowheads and the region ID numbers will be counted in connection with such block data of this arrangement 71(1).

Continuously referring to the upper row of FIG. 10, the block matching part 53 of the motion vector detecting unit 41 refers to the first and the second block arrangements 71(1) and 71(2) with attention directed to two block data representing the eye of the fish and hatched and detects a block correspondence indicated between these two block data by a dashed line. When counted by the region ID numbers mentioned above, the block coincidence represents one of the block motion vectors that has a combination of x and y components of (−3, −2).

Along a lower row of FIG. 10, such block motion vectors are exemplified by short arrows on a left-hand side in the first block arrangement 71(1) as regards those eight of the blocks which are indicated by hatches and in which the moving object is present. It may again be pointed out that the 24×24 blocks of each block arrangement is depicted in FIG. 10 as eight by eight rectangles and consequently that each rectangle is identical with a region datum. In the motion vector detecting unit 41, the histogram forming part 57 accumulates such block motion vectors in each block datum of the first block data arrangement 69. Based on the histogram, the peak detector 59 detects, in connection with only two of the region data of the first block data arrangement 69, the region motion vectors depicted in common in these two region data which are indicated with hatches.

Continuing reference to the lower row of FIG. 10, the region estimating part 61 of the correspondence establishing unit 45 calculates the estimated datum among the region data of the first region data arrangement 69 in order to enable the region matching part 63 to identify the moving object or objects. On so calculating the estimated datum, the region estimating part 61 will find some of the region motion vectors indefinite as described in connection with FIG. 7 at the thirty-fourth primary step ST34. It is possible to make the block matching part 53 judge each block motion vector as indefinite when none of the adjacent areas of the second key frame 71(2) has a very small amount of the least color change relative to each block of the first key frame 71(1) as indicated with no hatches on the left-hand side and with no block motion vectors. When the block motion vectors are indefinite, the peak detector 59 judges that the region motion vectors are also indefinite in corresponding region data which are not hatched in the first region data arrangement 69. No region motion vectors are present in such region data which are not hatched.

Reviewing FIGS. 1 to 10, it is possible to understand a combination of the key frame detecting unit 33 and the key frame memory unit 35 as a separating arrangement for separating, from a succession of video data supplied from the frame separating unit 31, at least two key frames, such as 67(1) and 67(2), representative of at least one moving object exemplified by the fish in FIGS. 8 and 9 and in the upper row of FIG. 10. The region detecting unit 37 and the region memory unit 39 serve in cooperation as a forming arrangement for forming the region data 69 in the first key frame 67(1). The motion vector detecting unit 41 and the motion vector memory unit 43 cooperate with the key frame and the region memory units 35 and 39 as a detecting arrangement for detecting a region motion vector, exemplified in the region data 69 in the lower row of FIG. 10, relative to the second key frame 67(2). The correspondence establishing unit 45 and the correspondence memory unit 47 serve collectively and in cooperation with the region and the motion vector memory units 39 and 43 as an establishing arrangement for establishing the correspondence between the region motion vector and the region data to identify the above-mentioned at least one moving object. In this example, the motion vector detecting arrangement judges the region motion vector as indefinite if the region data 69 of the first key frame 67(1) can not be related beyond a threshold to similar region data which are adjacent in position in the second key frame 67(2) to each of the region data 69 to which attention is directed in the first key frame 67(1).

Figure 11:
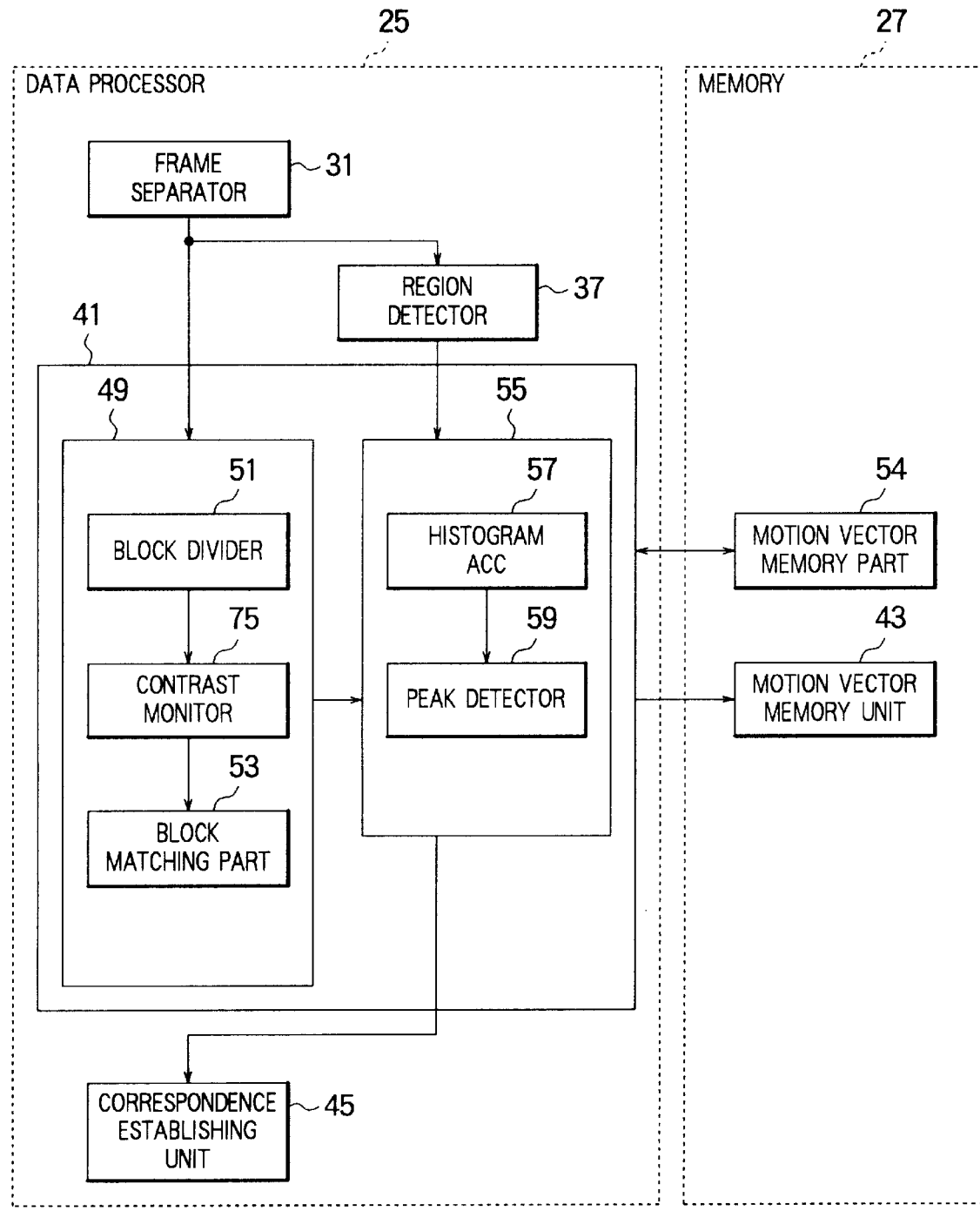
FIG. 11 is a block diagram of a video analysis device according to a second embodiment of this invention.

Referring now to FIG. 11, the description will proceed to a video analysis device according to a second preferred embodiment of this invention. It should be noted in the following that such video analysis devices are not different, unless otherwise mentioned, from the video analysis device described above in conjunction with FIGS. 1 and 4.

In the motion vector detecting unit 41 of FIG. 11, the block motion vector detecting part 49 comprises a contrast monitor 75 between the block divider 51 and the block matching part 53. Supplied with the blocks, such as 71(1) (FIG. 10), of the first key frame 67(1) (FIGS. 8 and 9), the contrast monitor 75 checks a contrast value of each block relative to adjacent blocks and evaluates the contrast value with reference to a predetermined value used as a contrast threshold to reject the block of a low contrast value as a relatively unreliable one of the blocks 71(1), leaving others of the blocks as reliable blocks. The block matching part 53 is therefore supplied only with the reliable blocks to detect the block motion vectors in connection with the reliable blocks of the first key frame 67(1) and the adjacent areas of the second key frame 67(2), regarding other block motion vectors, even if detected, as indefinite. In this manner, it is possible to understand that the contrast monitor 75 and consequently the block and the region motion vector detecting parts 49 and 55 decides the block and the region motion vectors as indefinite in connection with the blocks of the low reliability and the region data comprising the relatively unreliable blocks.

Figure 12:
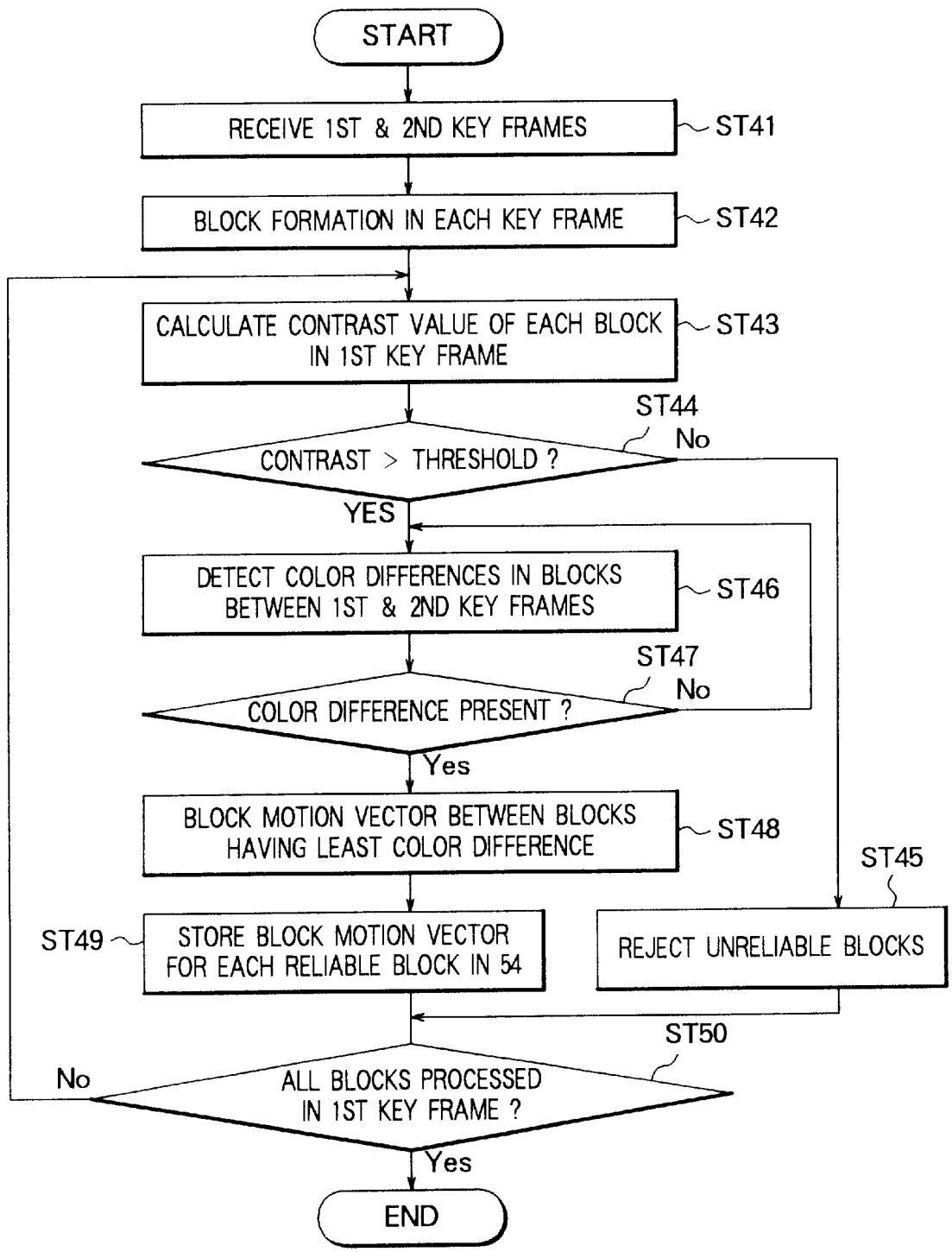
FIG. 12 shows a flow chart for use in describing operation of the video analysis device depicted in FIG. 11.

Turning to FIG. 12 with FIG. 11 continuously referred to, the description will be directed to operation of the video analysis device of FIG. 11 and, more particularly, to the block motion vector detecting part 49 thereof. At a first secondary step ST41, the block divider 51 receives the first and the second key frames 67(1) and 67(2) from the key frame memory unit 43 and preferably directly from the key frame separating unit 33, respectively, like the eleventh primary step ST11 depicted in FIG. 5. The block divider 51 divides each key frame into the blocks at a second secondary step ST42 like at the twelfth primary step ST12.

Now the contrast monitor 75 calculates the contrast value of each block in the first key frame 67(1) at a third secondary step ST43. The contrast monitor 75 checks at a fourth secondary step ST44 whether or not the contrast value is higher than the contrast threshold. If the contrast value is not higher than the contrast threshold, the fourth secondary step ST44 proceeds along a branch to a fifth secondary step ST45 of judging that such relatively unreliable blocks render the block motion vectors indefinite.

If the contrast value is higher than the contrast threshold at the fourth secondary step ST44, the block matching part 53 checks at a sixth secondary step ST46 the color difference between each reliable block of the first key frame 67(1) and the adjacent areas or blocks of the second key frame 67 and checks at a seventh secondary step ST47 whether or not the adjacent blocks have the color difference. The sixth and the seventh secondary steps ST46 and ST47 are similar to the thirteenth and the fourteenth primary steps ST13 and ST14 of FIG. 5 and are nevertheless processed in a shorter processing time because an amount of calculation is less than a calculation amount necessary in the thirteenth and the fourteenth primary steps ST 13 and ST 14. If no adjacent blocks are found, the seventh secondary step ST47 returns to the sixth secondary step ST46 until at least one of the adjacent blocks is formed at the seventh secondary step ST47. In such an event, the block matching part 53 detects at an eighth secondary step ST48 the block motion vector between the block in consideration in the first key frame 67(1) and a corresponding block that has a least color difference among the adjacent blocks in the second key frame 67(2).

The block matching part 53 stores at a ninth secondary step ST49 such block motion vectors in the motion vector memory part 54 in connection only with the reliable blocks of the first key frame 67(1). The motion vector detecting unit 41 therefore deals in this example with only reliable blocks with blocks having little features excluded as relatively unreliable blocks. This is effective in achieving a raised precision in operation of the video analysis device. Both the fifth and the ninth primary steps ST45 and ST49 proceed to a tenth secondary step ST50 at which the block matching part 53 checks whether or not all blocks are already processed in the first key frame 67(1). Even one block remains not yet processed in the first key frame 67(1), the tenth secondary step ST50 returns to the third secondary step ST43. If all blocks are already processed in the first key frame 67(1), the process comes to an END. The eighth and the tenth secondary steps ST48 and ST50 are similar to and are superior to the fifth and the sixth primary steps ST15 and ST16 as regards the shorter processing time and the raised precision in the operation.

Figure 13:
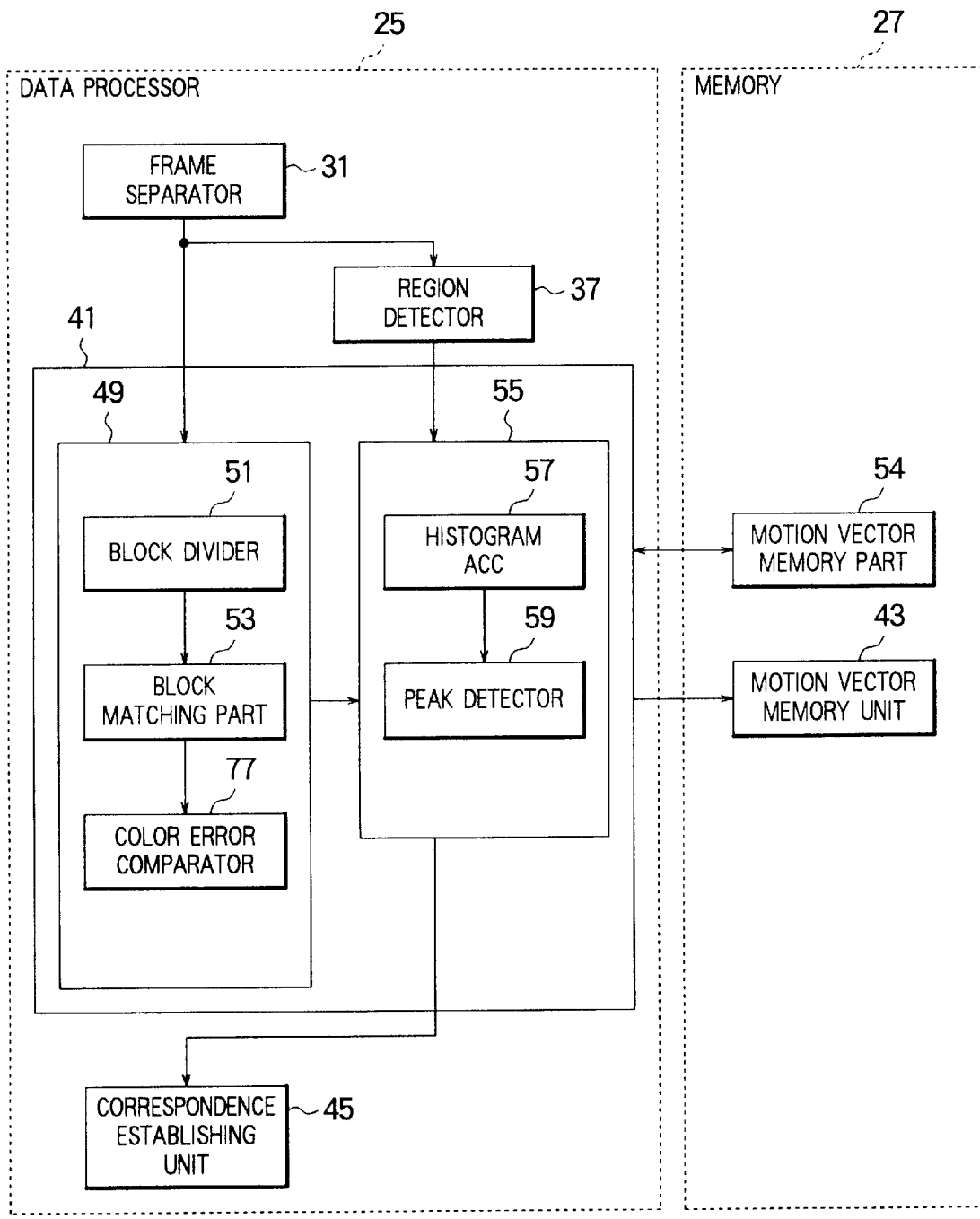
FIG. 13 is a block diagram of a video analysis device according to a third embodiment of this invention.

Referring to FIG. 13, attention will be directed to a video analysis device according to a third preferred embodiment of this invention. In the block motion vector detecting part 49 of the motion vector detecting unit 41, the block matching part 53 is not connected directly to the motion vector memory part 54 but through a color error comparator 77. It should be pointed out here in conjunction with FIGS. 8 and 10 that the first and the second key frames 67(1) and 67(2) are separated so inappropriately from each other as to make it very difficult, if not impossible, to find the block coincidence described with reference to FIG. 10. Such an undesirable case may occur in FIG. 8 when the fourth and the fifth frame images 65(4) and 65(5) are picked up as such first and second key frames so that the eye of the fish has already disappeared from this latter second key frame. The color error comparator 77 therefore first detects a color difference or error between two blocks which are used in the block matching part 53 in applying the block matching technique to produce one of block motion vectors. The color error comparator 77 subsequently compares a minimum of the color error with an error threshold and judges this one of the block motion vectors indefinite when this minimum color error is less than the threshold error. This obviates an adverse effect which would result in the block motion vectors when such inappropriately spaced key frames are dealt with.

Figure 14:
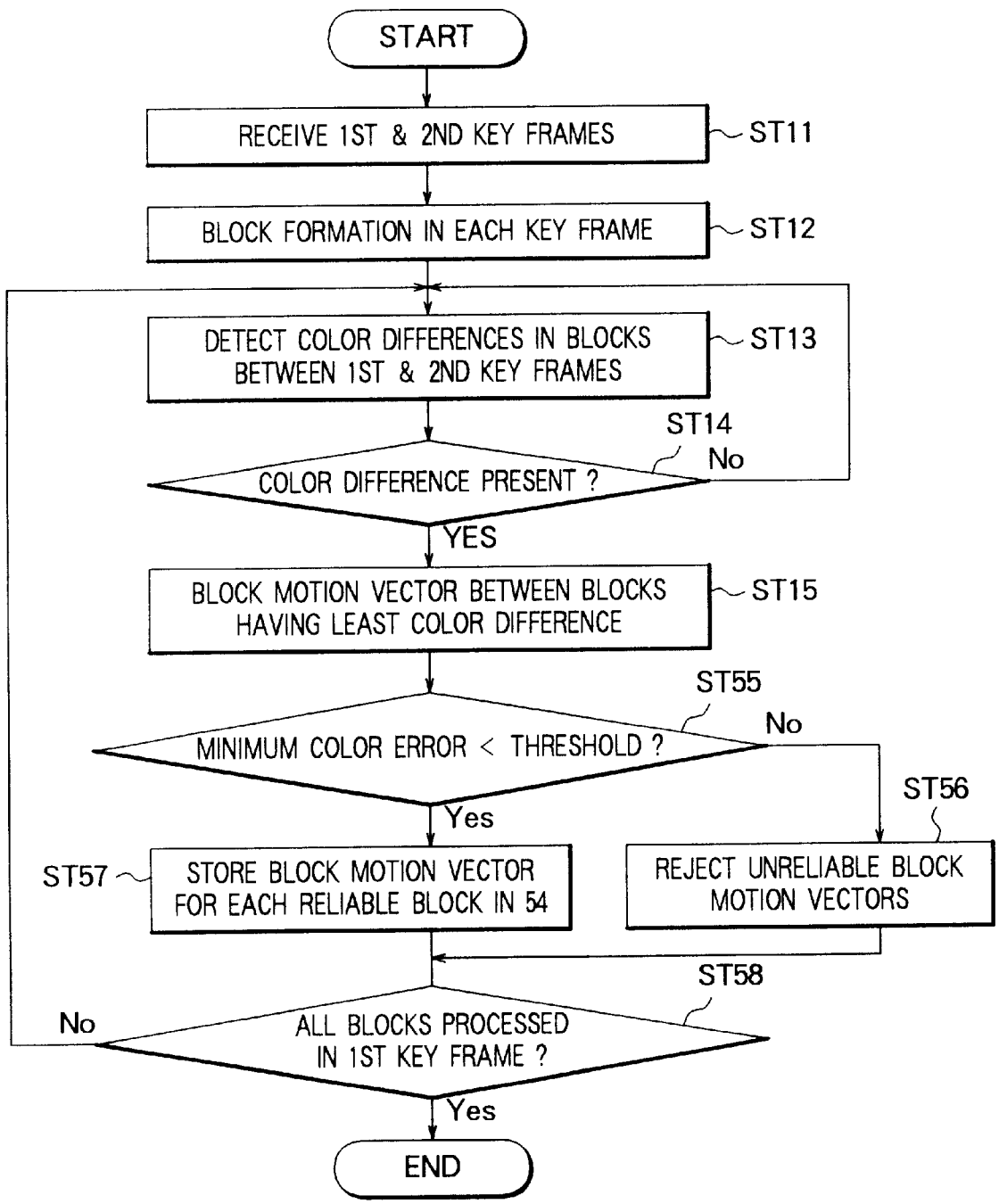
FIG. 14 shows a flow chart for use in describing operation of the video analysis device depicted in FIG. 13.

Turning to FIG. 14 with FIG. 13 continuously referred to, the description will be directed to operation of the video analysis device described in conjunction with FIG. 13 and, more particularly, to its block motion vector detecting part 49. Throughout the following, description of the steps will be omitted whenever the steps are identical with those described with reference to FIG. 5. Such steps are designated by the primary steps used in FIG. 5.

When the block matching part 53 detects the block motion vector at the fifteenth primary step ST15, the color error comparator 77 checks, at a first tertiary step ST55 whether or not the color error is less than the error threshold. If the minimum color error is not less than the error threshold, the first tertiary step ST55 proceeds through a branch to a second tertiary step ST56 at which the color error comparator 77 rejects delivery to the motion vector memory part 54 of the block motion vector of which the minimum color error is smaller or equal to the error threshold. This second tertiary step ST56 is therefore for judgement of the block motion vector as indefinite to reject the block motion vector under consideration.

If the minimum color error is less than the error threshold at the first tertiary step ST55, the color error comparator 77 stores the block motion vector in the motion vector memory part 54 at a third tertiary step ST57. In this manner, the motion vector memory unit 54 stores only reliable block motion vectors to make the region motion vector detecting part 55 operable in a shorter processing time. The second and the third tertiary steps ST56 and ST57 proceed to a fourth tertiary step ST58 at which the color error comparator 77 checks whether or not all blocks are already processed in the first key frame, such as 67(1). In an affirmative case, the operation comes to an END. If all the blocks are not yet dealt with, the fourth tertiary step ST58 returns to the thirteenth primary step ST13. This step ST58 is therefore similar to the sixteenth primary step ST16 of FIG. 5.

Figure 15:
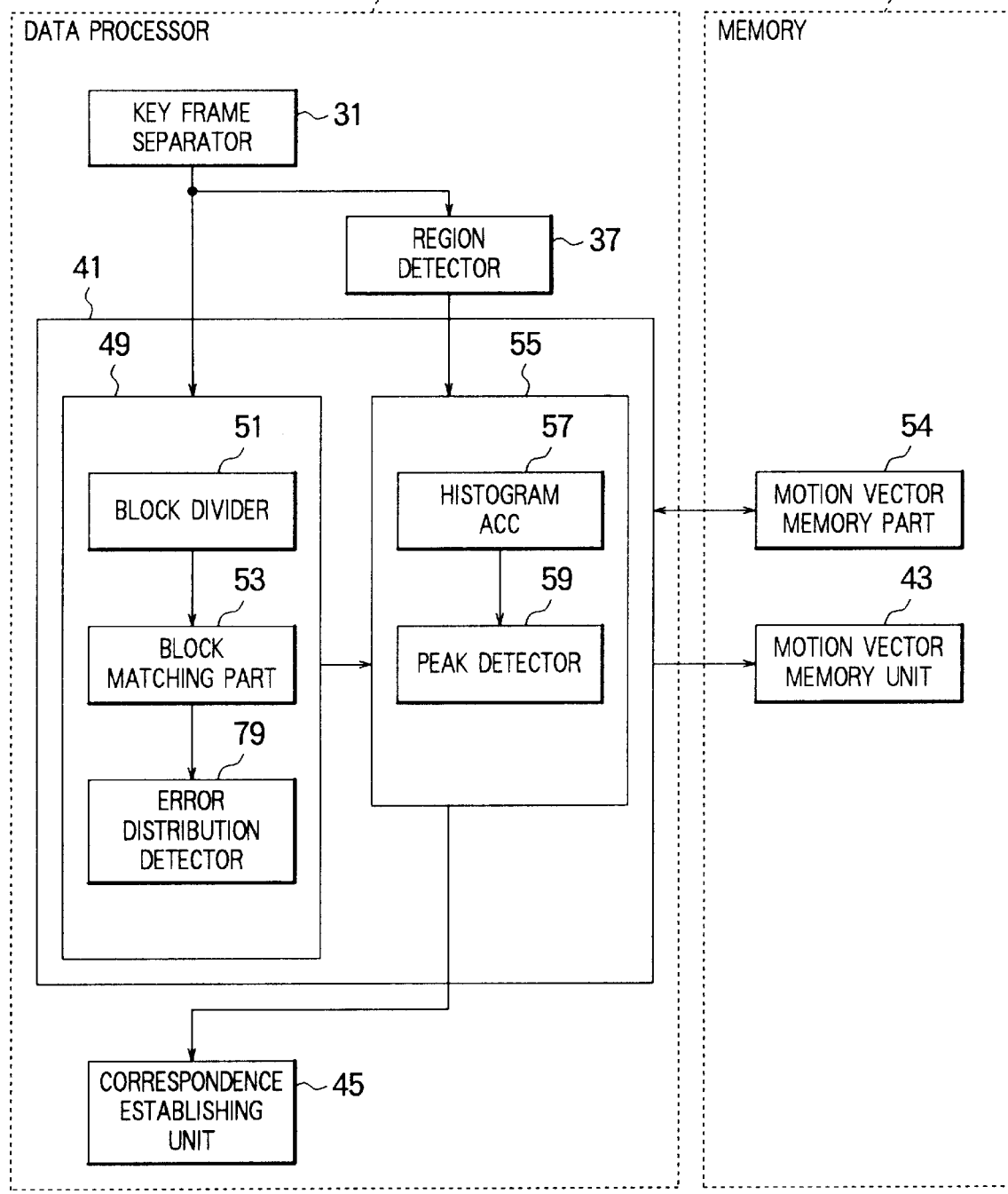
FIG. 15 is a block diagram of a video analysis device according to a fourth embodiment of this invention.

Referring to FIG. 15, the description will proceed to a video analysis device according to a fourth preferred embodiment of this invention. In the block motion vector detecting part 49 of the motion vector detecting unit 41, the block matching part 53 is not connected directly to the motion vector memory part 54 but through a color error distribution detector 79 for detecting whether or not the color errors are biassedly distributed or concentrated near their minimum value. It may be pointed out here that someone of backgrounds in the first key frame 67(1) may be similar in color by chance to the blocks positioned in the second key frame 67(2) adjacent to the blocks taken into consideration in the first key frame 67(1). In this event, the block correspondence may be in error and be indefinite. The block motion vector is unreliable if produced based on such an erroneous block coincidence. Rejection of the block motion vector in question consequently gives a raised precision.

Figure 16:
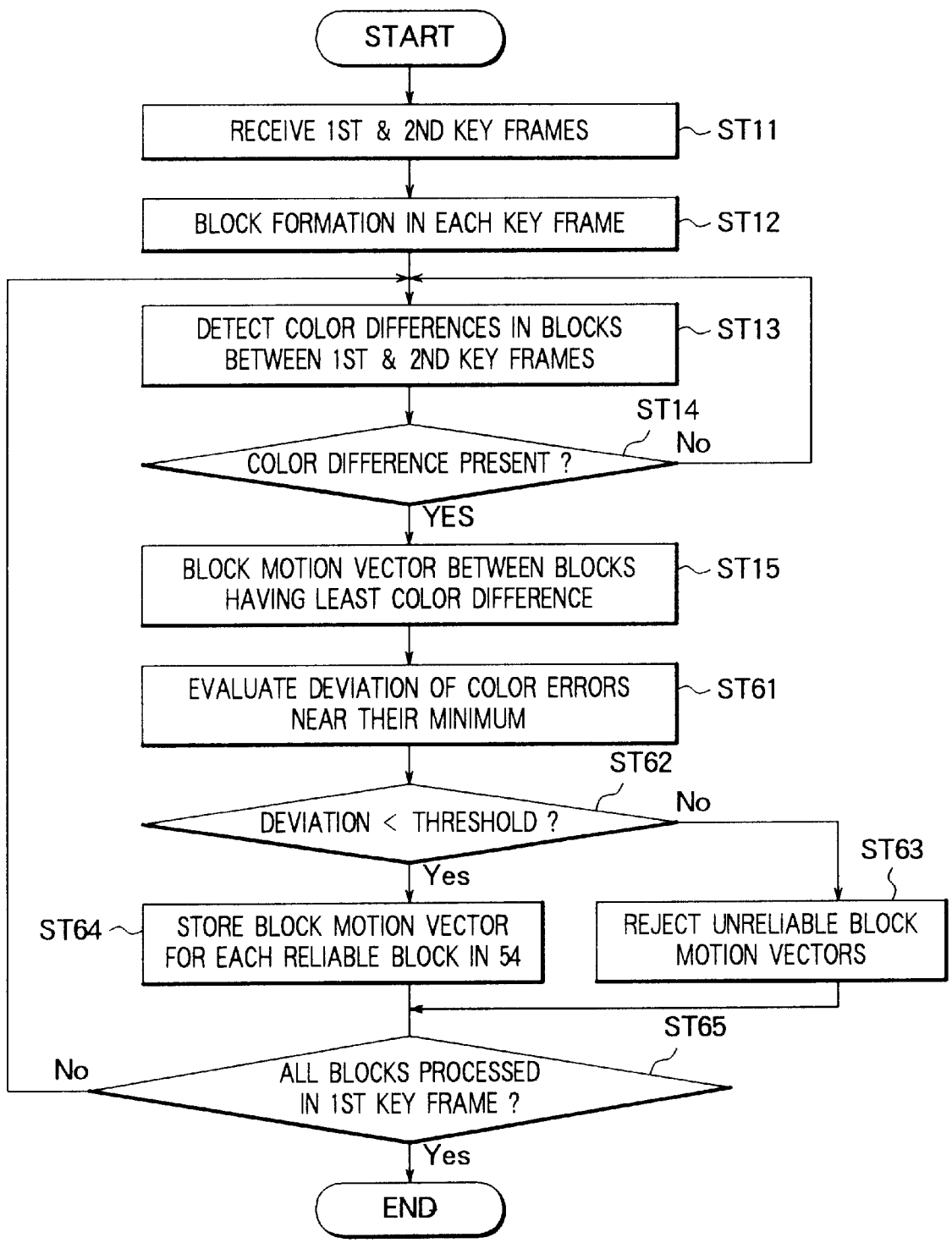
FIG. 16 shows a flow chart for use in describing operation of the video analysis device depicted in FIG. 15.

Turning to FIG. 16 with reference to FIG. 15 continued, operation will be described as regards the video analysis device of FIG. 5 and, in particular, the block motion vector detecting part 49 thereof. When the block matching part 53 finds one of the block motion vectors at the fifteenth primary step ST15, the color error distribution detector 79 receives the color errors from the block matching part 53 which are used in detecting the block correspondence to produce this one of the block motion vectors. The color error distribution detector 79 first evaluates a deviation of the color errors near their minimum at a first quaternary step ST61. Subsequently, the color error distribution detector 79 checks at a second quaternary step ST62 whether or not the deviation is less than a deviation threshold or whether or not no deviation is present. If the deviation is not less than the deviation threshold, the second quaternary step ST62 proceeds through a branch to a third quaternary step ST63 at which the color error distribution detector 79 judges that the block motion vector is produced in connection with the block correspondence of a low reliability. The color error distribution detector 79 rejects such block motion vectors from storage in the motion vector memory part 54.

If the deviation is less than the deviation threshold at the second quaternary step ST62, the color error distribution detector 79 stores the block motion vector in the motion vector memory part 54 at a fourth quaternary step ST64, judging that the block motion vector under consideration is produced by the block matching part 53 for a reliable block correspondence. The third and the fourth quaternary steps ST63 and ST64 proceed to a fifth quaternary step ST65 at which the color error distribution detector 79 checks whether or not all blocks are already processed in the first key frame 67(1). In an affirmative case, the operation comes to an END. If all blocks are not yet dealt with, the fifth quaternary step ST65 returns to the thirteenth primary step ST13. It will now be understood that the third to the fifth quaternary steps ST63 to ST65 are similar to the second to the fourth tertiary steps ST56 to ST58, respectively.

Figure 17:
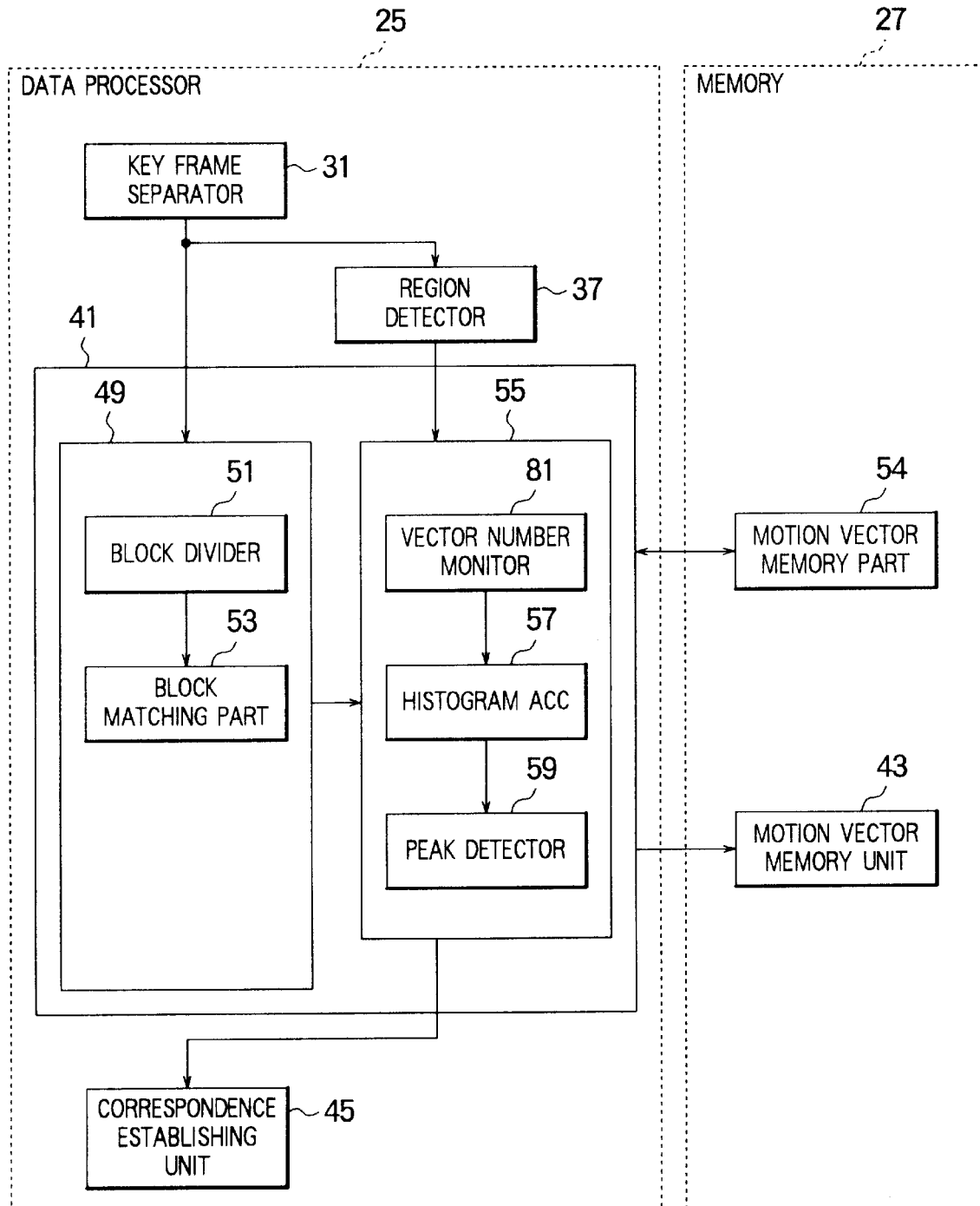
FIG. 17 is a block diagram of a video analysis device according to a fifth embodiment of this invention.

Referring to FIG. 17, the description will proceed to a video analysis device according to a fifth preferred embodiment of this invention. In the motion vector detecting unit 41, the block motion vector detecting part 49 is not different from that described with reference to FIGS. 2 and 5. In contrast, the region motion vector detecting part 55 is different as follows.

More particularly, the histogram forming part 57 is connected to none of the region detecting unit 37, the block motion vector detecting part 49, and the motion vector memory part 54. Instead, a vector number monitor 81 is connected to. Supplied from the region detecting unit 37 with each region datum of the first key frame 67(1) and the block motion vectors from the block motion vector detecting and the motion vector memory parts 49 and 54, the vector number monitor 81 counts a vector number of block motion vectors in the region datum and compares the vector number with a number threshold. When the vector number is not greater than the number threshold, the vector number monitor 81 judges that the region datum is an indefinite datum. Excluding such indefinite data, the vector number monitor 81 supplies remaining ones of the region data of the first key frame 67(1) to the histogram forming part 55 as definite or effective data.

It is now understood in a right-hand bottom corner of FIG. 10 that hatched region data of the first region data arrangement 69 show the definite data. The vector number monitor 81 judges that other data of the arrangement 69 are indefinite. The region vector detecting part 55 of FIG. 17 can therefore detect the region movement vectors with a raised precision and in a shorter processing time. It is possible to understand that the vector number monitor 81 judges that the region motion vectors are indefinite when they are detected in the indefinite datum or data.

Figure 18:
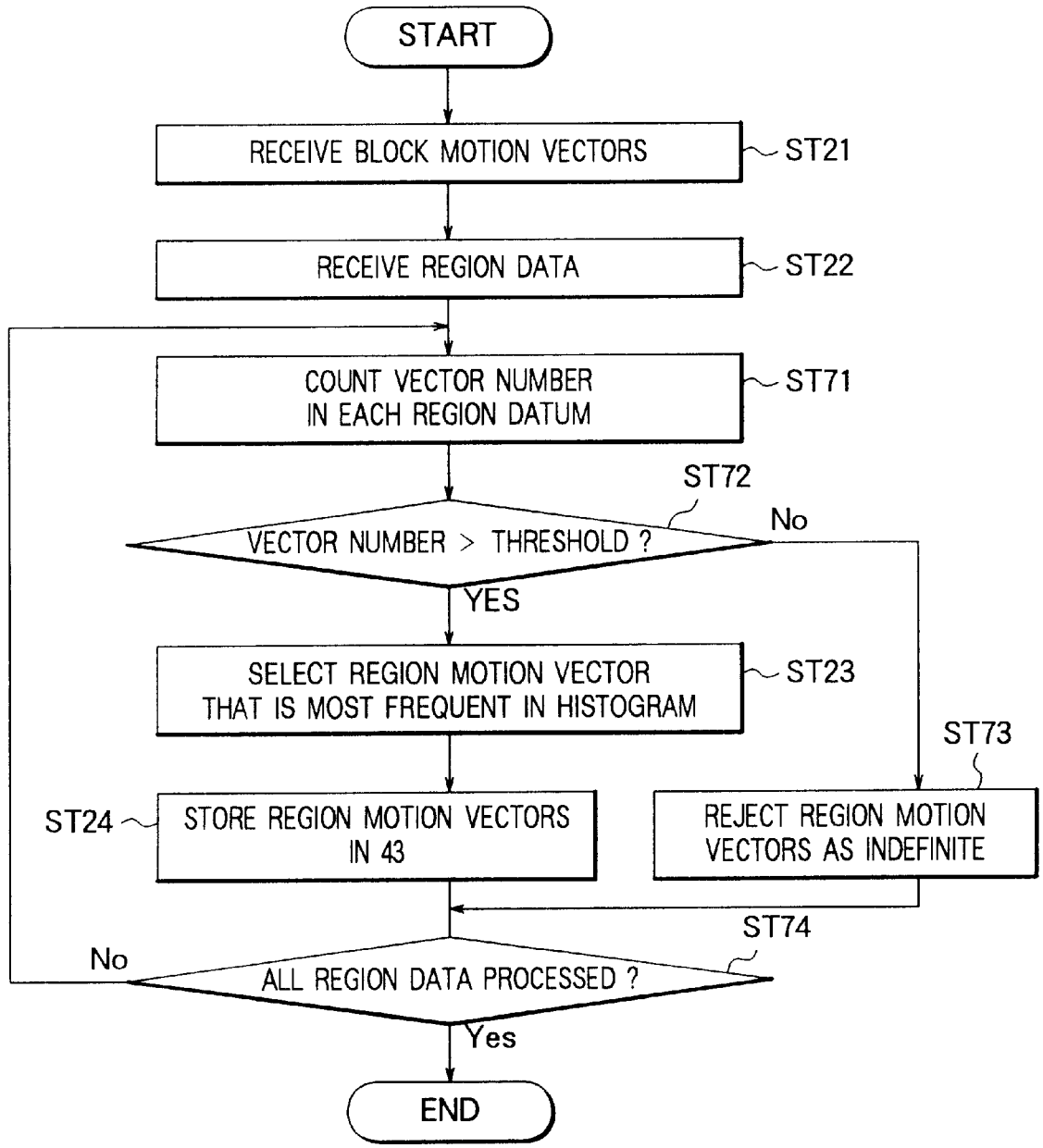
FIG. 18 shows a flow chart for use in describing operation of the video analysis device depicted in FIG. 17.

Turning to FIG. 18 with FIG. 17 continuously referred to, attention will be directed to operation of the video analysis device depicted in FIG. 17 and, in particular, the region motion vector detecting part 55 thereof. Steps are therefore designated by the reference symbols used in FIG. 6 when they are identically operable.

At a first quinary step ST71, the vector number monitor 81 counts the vector number of the block motion vectors in each region datum of the first key frame 67(1) and checks at a second quinary step ST72 whether or not the vector number is greater than the number threshold. Whenever the vector number is not greater than the number threshold, the vector number monitor 81 makes at a third quinary step ST73 the region motion vector detecting part 55 regard the region motion vectors indefinite if they are to be calculated for such indefinite region data.

If the vector number is greater than the number threshold at the second quinary step ST72, the vector number monitor 81 makes remaining parts of the region motion vector detecting parts deal with the twenty-third and the twenty-fourth primary steps ST23 and ST24 until the peak detector 59 check at a fourth quinary step ST74 whether or not all region data of the first key frame 67(1) are already dealt with. In an affirmative case, the operation comes to an END for the first key frame 67(1). If all region data are not yet processed in connection with the first key frame 67(1), the fourth quinary step ST74 is turned back to the first quinary step ST71. The third quinary step ST73 proceed directly to the fourth quinary step ST74. It is understood that the fourth quinary step ST74 corresponds to the twenty-fifth primary step ST25 of FIG. 6.

Figure 19:
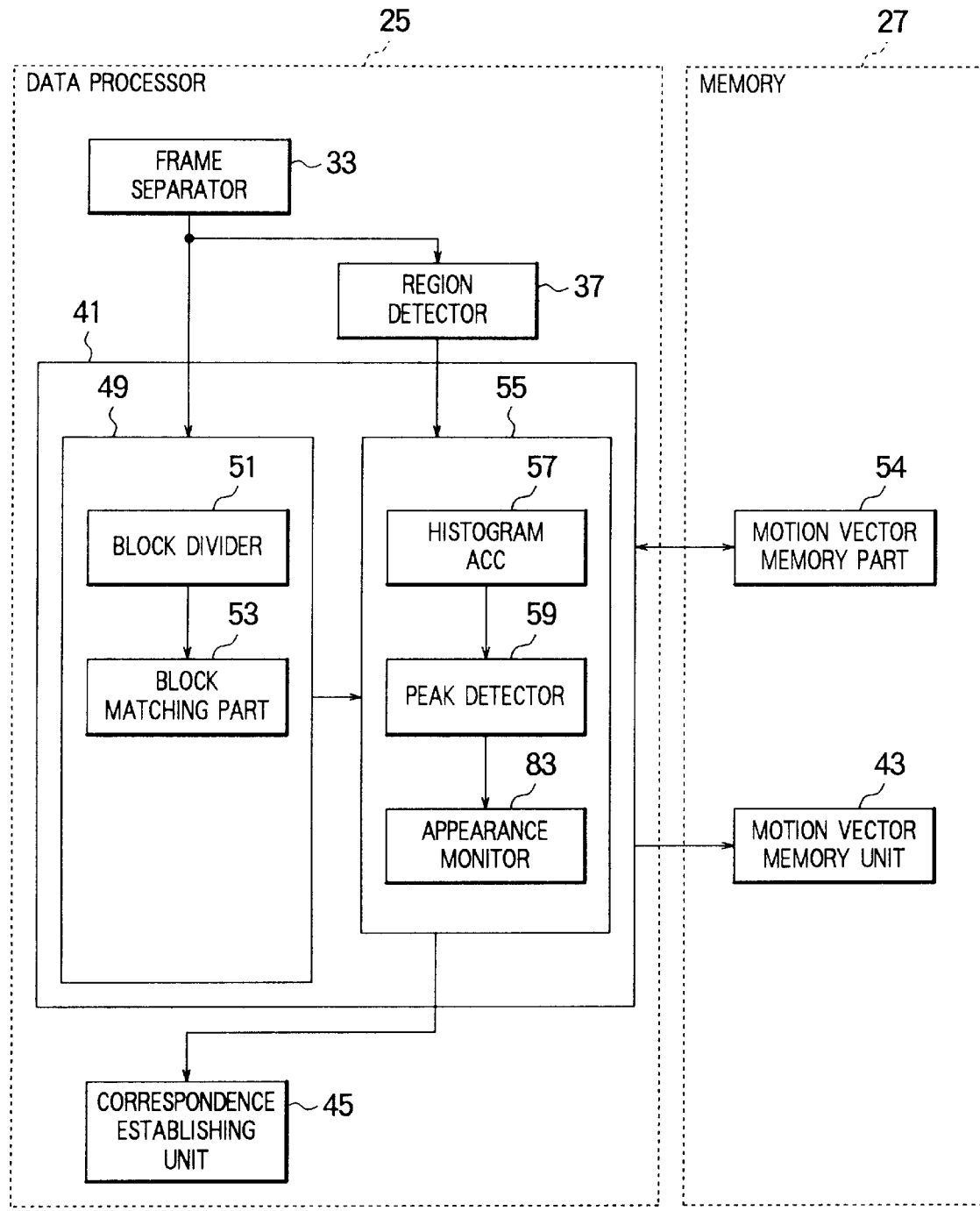
FIG. 19 is a block diagram of a video analysis device according to a sixth embodiment of this invention.

Referring to FIG. 19, attention will be directed to a video analysis device according to a sixth preferred embodiment of this invention. In the motion vector detecting unit 41, the block motion vector detecting part 49 is identical with that illustrated with reference to FIGS. 2 and 5 as in FIG. 17. The region motion vector detecting part 55 is again different in the manner described in the following.

The histogram forming part 57 is connected to the region detecting unit 37, the block motion vector detecting part 49, and the motion vector memory part 54 as in FIG. 3. The peak detector 59 is, however, not directly connected to the motion vector memory unit 43 and the correspondence establishing unit 45 but through an appearance monitor 83. Responsive to the region motion vectors successively delivered for the region data, the appearance monitor 83 measures an appearance rate or ratio of a most frequently appearing region motion vector for each region datum to the region motion vectors of all the region data. In the example described in conjunction with FIG. 10, the region motion vector is absent in the region data depicted without hatches in the arrangement 69. The appearance monitor 83 therefore compares the appearance rate with an appearance threshold and judges that the region motion vectors or the region data are indefinite where the appearance ratio is not greater than the appearance threshold.

Figure 20:
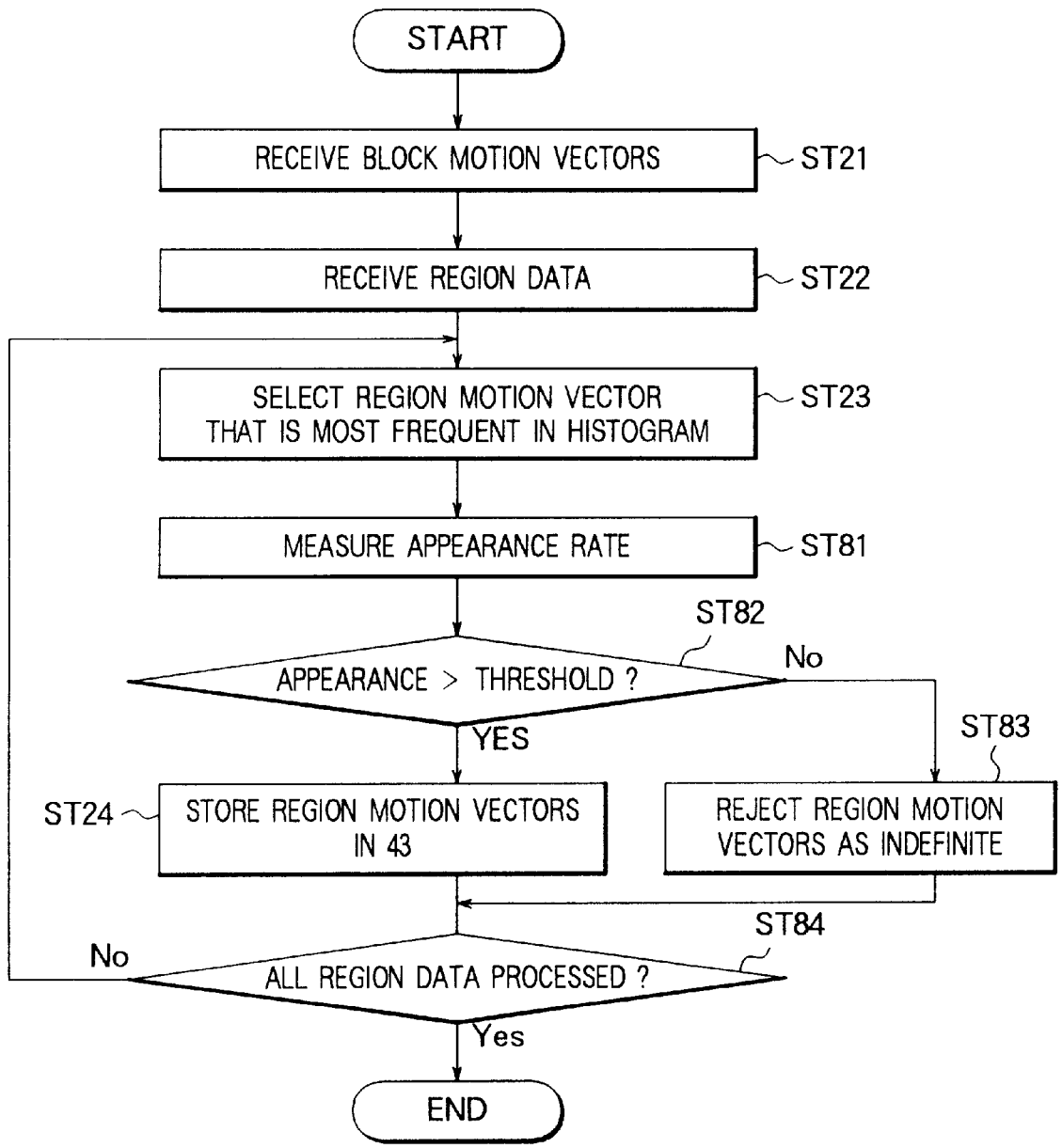
FIG. 20 shows a flow chart for use in describing operation of the video analysis device depicted in FIG. 19.

Turning to FIG. 20 with FIG. 19 continuously referred to, attention will be directed to operation of the video analysis device of FIG. 19 and, more particularly, to the region motion detecting part 55 thereof. When supplied from the peak detector 59 with the region motion vectors one by one, the appearance monitor 83 first measures at a first sextiary step ST81 the appearance rate in connection with each region datum for which one of the region motion vectors is produced at the twenty-third primary step ST23. Subsequently, the appearance monitor 83 judges at a second sextiary step ST82 whether or not the appearance rate is greater than the appearance threshold. If the appearance rate is not greater than the appearance threshold, a branch is followed to a third sextiary step ST83 at which the appearance monitor 83 judges that the region datum under consideration and consequently its region motion vector is indefinite. In an affirmative case, a main flow proceed to the twenty-fourth primary step ST24. The main flow and the branch eventually proceed to a fourth sextiary step ST84 which is not different in effect from the fourth quinary step ST74 of FIG. 18.

Figure 21:
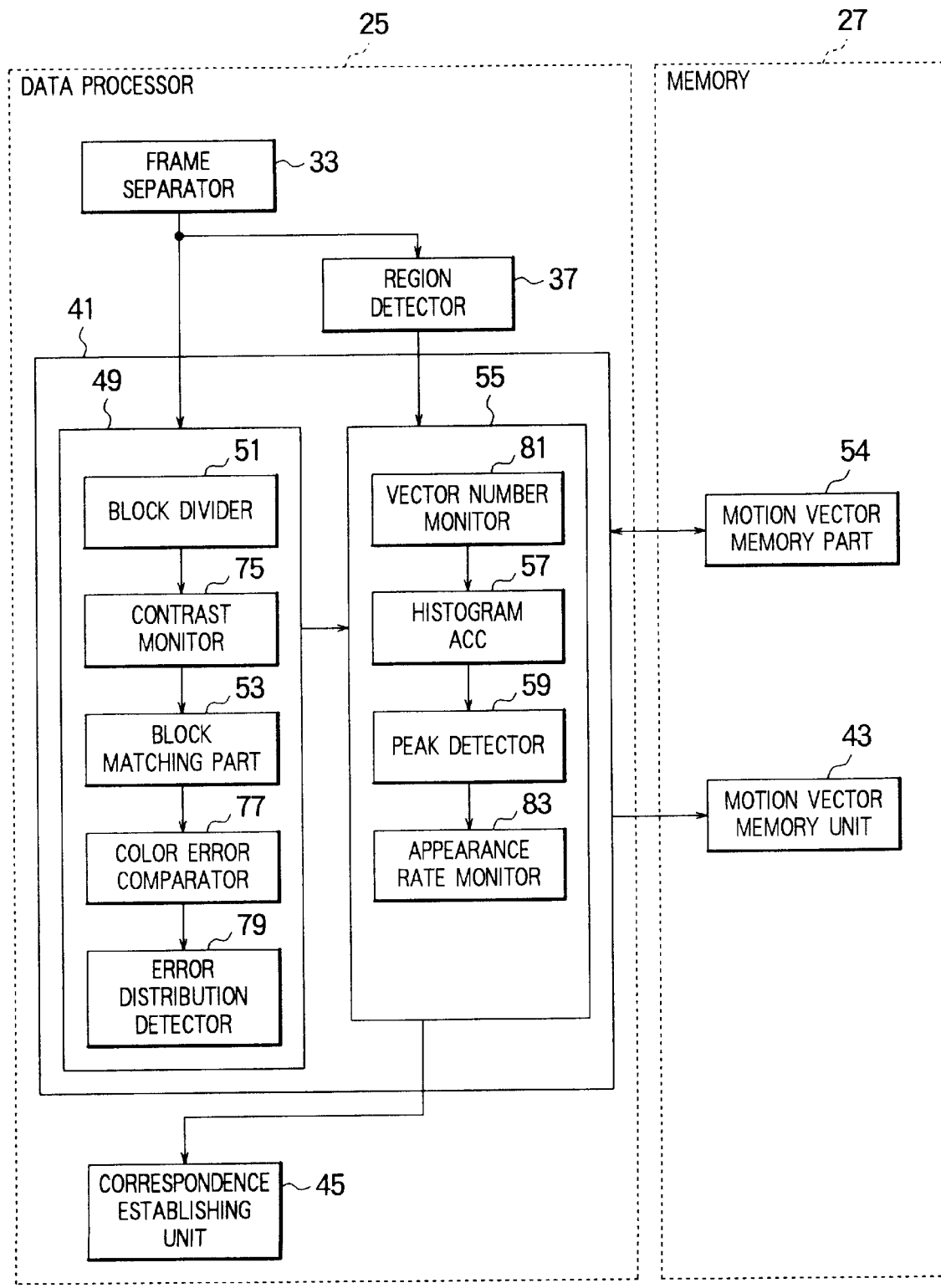
FIG. 21 is a block diagram of a video analysis device according to a seventh embodiment of this invention.

Referring to FIG. 21, the description will proceed to a video analysis device according to a seventh preferred embodiment of this invention. In this video analysis device, the motion vector detecting unit 41 is a wholesome combination of the region motion vector detecting units 41 described in conjunction with FIGS. 2, 11, 13, 15, 17 and 19. It should, however, be noted in the block motion vector detecting part 49 that the contrast monitor 75 is interposed between the block divider 51 and the block matching part 53 as in FIG. 11, that the color error comparator 77 and the error distribution detector 79 are successively connected to the block matching part 53, and that the motion vector memory part 54 is connected to the error distribution detector 79. In the region vector detecting part 55, the vector number monitor 81 is connected to the region detector 37, the motion vector memory part 54, and the histogram forming part 57 like in FIG. 17 and to the error distribution detector 79 and that the appearance rate monitor 83 is connected to the peak detector 59, the motion vector memory unit 43, and the correspondence establishing unit 45 as in FIG. 19.

Figure 22:
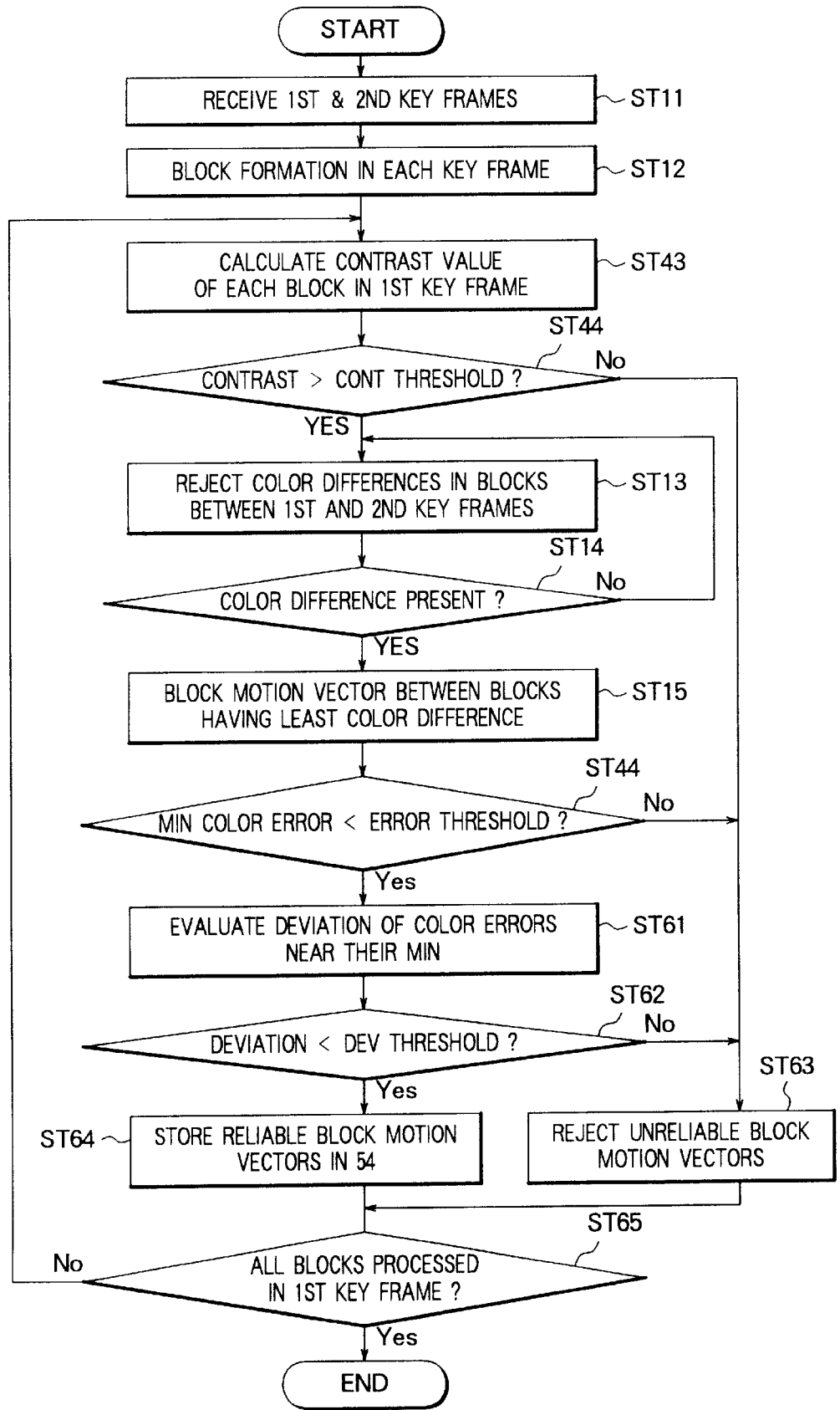
FIG. 22 shows a flow chart for use in describing operation of a block motion vector detecting part depicted in FIG. 21.
Figure 23:
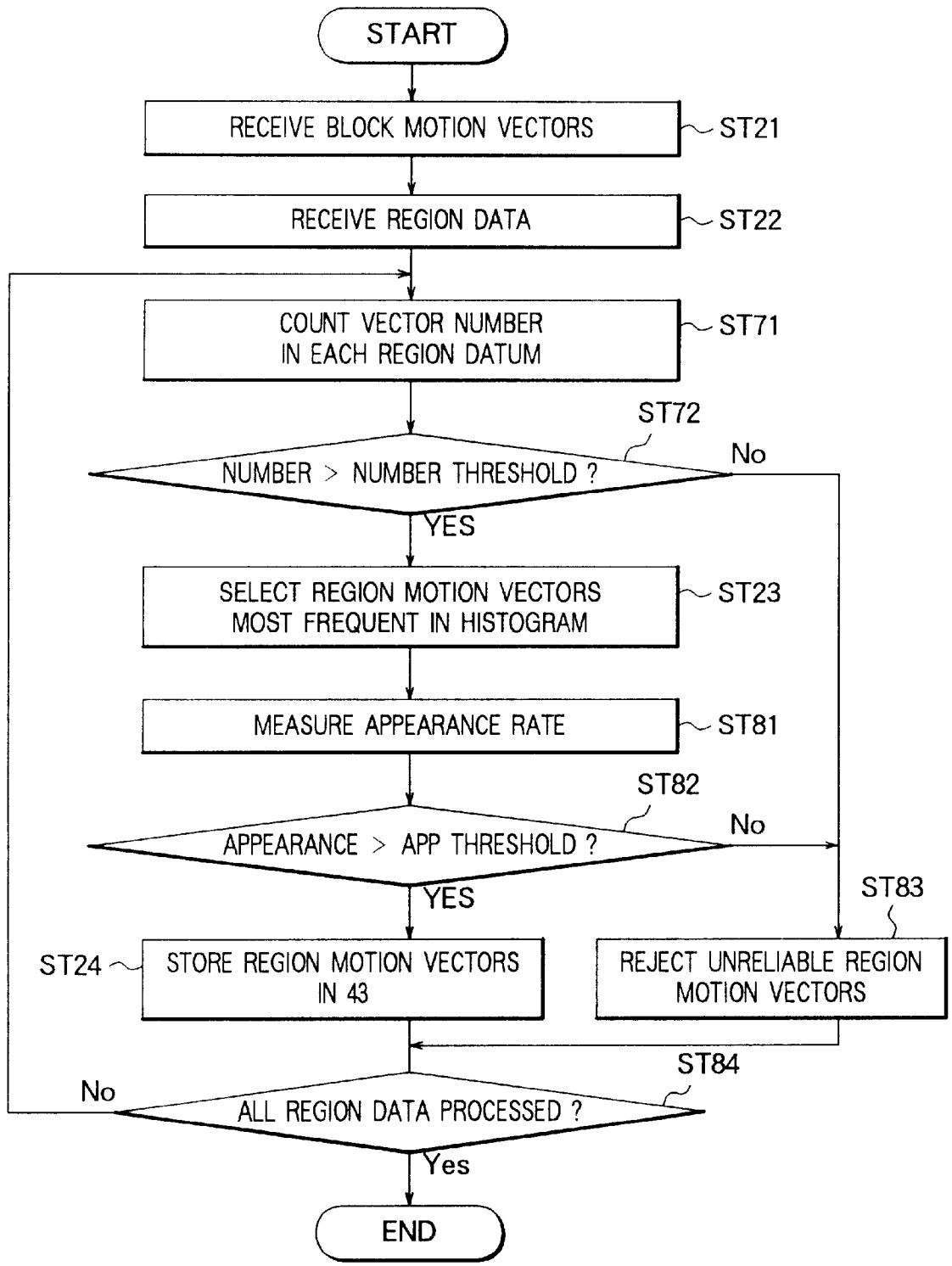
FIG. 23 shows a flow chart for use in describing operation of a region motion vector detecting part depicted in FIG. 21.

Turning to FIG. 22 and then to FIG. 23, operation of the video analysis device of FIG. 21 and, more in particular, the motion vector detecting unit 41 thereof can be illustrated by a combination of the flow charts described in conjunction with FIGS. 5, 6, 12, 14, 16, 18, and 20. Detailed description will therefore be omitted. It should only be mentioned in this connection that the main flow of operation has three branches in FIG. 22 and two branches in FIG. 23.

Reviewing FIGS. 1 to 23, it is noted that the motion vector memory part 54 may not be in practice an independent part but may be a part of the motion vector memory unit 43. In cooperation with such a motion vector memory unit 43, the contrast monitor 75, the color error comparator 77, the error distribution detector 79, the vector number monitor 81, and/or the appearance monitor 83 serve as a vector rejecting arrangement for rejecting the block or the region motion vectors of a poor reliability.

It is now understood in connection with this invention that only the key frames, such as 67(1) and 67(2), are used in detecting the block motion vectors and consequently the region motion vectors and that this reduces the number of frame images, such as 65(2) to 65(5), which should be processed on detecting the moving objects and shortens the processing time. It should be noted in this regard that the key frames are duly representative of the moving objects and that use of only the key frames keeps a deterioration of detection of the moving objects within an allowable extent.

Moreover, the rejecting arrangement makes it possible to further raise an operation speed and additionally achieve a higher precision. This is because the contrast detector 75 rejects the blocks in a first one of the two consecutive key frames 67(1) and 67(2) when each of the blocks has a low contrast value such as to introduce an inadvertent error into the block motion vector and consequently into the region motion vector. The color error comparator 77 similarly rejects such blocks of a great color error to avoid detection of an undesirable block motion vector and to raise the operation speed and the precision of detection of the region motion vectors. The error distribution detector 79 likewise rejects similar blocks to avoid detection of inappropriate block motion vectors in a number of blocks at which their color changes are coincident by chance. The error distribution detector 79 can therefore reject undesirable region motion vectors and therefore raise the operation speed and the precision of the results. The vector number monitor 81 rejects the region datum or data where the region motion vectors are meaningless in the first key frame 67(1). In the manner, the vector number monitor 81 makes the region motion vector detecting unit 41 deal with only definite region data of the key frames, such as the first and the second key frames 67(1) and 67(2), and raise the operation speed and the precision. The appearance monitor 83 rejects each region datum where the block motion vectors, four in number in the example described, have considerable deviations. The appearance monitor 83 therefore makes the correspondence establishing unit 45 process the region motion vectors with a raised operation speed and the raised precision.

While an appreciable number of preferred embodiments of this invention have thus far been described, it will be readily possible for one skilled in the art to put this invention into practice in various other manners. Above all, it is possible to combine the motion vector detecting unit 41 of FIG. 2 with any one of the motion vector detecting units 41 of FIGS. 11, 13, 15, 17, and 19. It is moreover possible to combine any one of such modifications with the correspondence establishing unit 45 described with reference to FIG. 3.

What is claimed is:

1. A video analysis method comprising the steps of:

separating from a successive of video data two key frames representative of a moving object;

forming a predetermined number of region data in a first key frame of said two key frames;

detecting in response to said region data a region motion vector in said first key frame relative to a second key frame of said two key frames; and establishing a correspondence between said region motion vector and said region data to identify said moving object.

2. A video analysis method as claimed in claim 1, wherein said detecting step comprises the steps of:

dividing said first key frame into a plurality of blocks, equal in number to an integral multiple of said predetermined number;

detecting a block motion vector between each block and an area corresponding in said second key frame to said each block to detect block motion vectors in said blocks; and detecting said region motion vector in response to the block motion vectors detected in each of said region data.

3. A video analysis method as claimed in claim 2, further comprising during said block motion detecting step the step of rejecting among said block motion vectors at least one block motion vector of a poor reliability to leave reliable block motion vectors and to make said region motion vector detecting step detect said region motion vector in response only to said reliable clock motion vectors.

4. A vector analysis method as claimed in claim 2, further comprising during said region motion detecting step the step of rejecting at least one region datum of a poor reliability to leave reliable region data to make said region motion vector detecting step detect said region motion vector in response to the block motion vectors detected in each of said reliable region data and to make said establishing step establish as said correspondence a more precise correspondence between said region motion vector and each of said reliable region data.

5. A video analysis device comprising:

separating means for separating from a succession of frame images two key frames representative of a moving object;

forming means for forming a predetermined number of region data in a first key frame of said two key frames;

detecting means responsive to said region data for detecting a region motion vector in said first key frame relative to a second key frame of said two key frames; and establishing means for establishing a correspondence between said region motion vector and said region data to identify said moving object.

6. A video analysis device as claimed in claim 5, wherein said detecting means comprises:

block motion vector detecting means for detecting a block motion vector by applying block matching to said first and said second key frames to detect a plurality of block motion vectors in said first key frame; and region motion vector detecting means responsive to said region data for detecting said region motion vector by selecting a selected motion vector in each of said region data from said block motion vectors.

7. A video analysis device as claimed in claim 6, wherein said block motion vector detecting means comprises:

a block divider for dividing said first key frame into a plurality of blocks, equal in number to an integral multiple of said predetermined number; and block matching means for applying said block matching between said blocks and said second key frame to detect said block motion vectors.

8. A video analysis device as claimed in claim 7, wherein said block matching means comprises difference detecting means for detecting a color difference between each of said blocks and an adjacent area adjacent in position in said second key frame to detect said block motion vector directed in said first key frame to said each of blocks from a portion which has in said adjacent area a minimum of said color difference.

9. A video analysis device as claimed in claim 7, wherein said block matching means comprises rejecting means for rejecting among said blocks at least one block of a poor reliability to leave reliable blocks, to make said block matching means use, as said each of blocks, each of only said reliable blocks, and to make said region vector detecting means detect said region motion vector by selecting said selected motion vector in each region datum composed of only said reliable blocks.

10. A video analysis device as claimed in claim 9, wherein said rejecting means comprises a contrast monitor for detecting a contrast value in color between said each of blocks and a portion corresponding among said adjacent area in position to said each of blocks and for checking whether or not said contrast value is greater than a predetermined threshold value, said contrast monitor deciding said each of blocks as one of said reliable blocks only when said contrast value is greater than said threshold value.

11. A video analysis device as claimed in claim 9, wherein said block divider is connected to said contrast value monitor to supply the blocks produced thereby to said contrast value monitor.

12. A video analysis device as claimed in claim 9, wherein said rejecting means comprises a color error comparator for detecting a minimum color error between said each of blocks and an adjacent area adjacent in position to said each of blocks in said second key frame and for checking whether or not said minimum color error is less than a predetermined error threshold, said color error comparator deciding said each of blocks as one of said reliable blocks only when said minimum color error is less than said error threshold.

13. A video analysis device as claimed in claim 12, wherein said block matching means is connected to said color error comparator for supplying said color error comparator with the blocks used in said block matching means and said adjacent area.

14. A video analysis device as claimed in claim 13, wherein said rejecting means comprises an error distribution detector for detecting a color error distribution in said blocks and for checking whether or not said color error distribution is less than a predetermined distribution threshold at each of said blocks, said error distribution detector deciding said each of blocks as one of said reliable blocks only when said color error distribution is less than said distribution threshold.

15. A video analysis device as claimed in claim 14, wherein said color error comparator is connected to said error distribution detector to supply said error distribution detector with the blocks used in said block matching means.

16. A video analysis device as claimed in claim 9, wherein said rejecting means comprises an error distribution detector for detecting a color error distribution in said blocks and for checking whether or not said color error distribution is less than a predetermined distribution threshold at each of said blocks, said error distribution detector deciding said each of blocks as one of said reliable blocks only when said color error distribution is less than said distribution threshold.

17. A video analysis device as claimed in claim 16, wherein said block matching means is connected to said error distribution detector to supply said error distribution with the blocks used in said block matching means.

18. A video analysis device as claimed in claim 9, wherein region motion vector detecting means comprises:
   histogram forming means responsive to said region data and said block motion vectors for forming in connection with each region datum a histogram of said block motion vectors; and
   peak detecting means responsive to said region data, said block motion vectors, and said histogram for detecting as said selected motion vector for each region datum one of said block motion vectors that most frequently appears in said histogram, said peak detecting means thereby detecting a plurality of region motion vectors for said region data, respectively.

19. A video analysis device as claimed in claim 18, wherein said histogram forming means comprises:
   a vector number monitor responsive to said region data and said block motion vectors for counting a vector number of said block motion vectors in said each region datum and for checking whether or not said vector number is greater than a predetermined threshold value, said vector number monitor deciding said block motion vectors as reliable motion vectors when said vector number is greater than said threshold value; and
   a histogram forming part responsive to said region data and said reliable motion vectors for improving said histogram into a reliable histogram to make said peak detecting means detect said region motion vectors in connection with said reliable histogram.

20. A video analysis device as claimed in claim 19, wherein said peak detecting means comprises:
   a peak detector responsive to said region data, said reliable histogram, and said block motion vectors for detecting said region vector in said reliable histogram and to detect said region motion vectors; and
   an appearance rate monitor responsive to said region data and said region motion vectors for measuring an appearance rate of the region motion vectors in each region datum to said region motion vectors in all said region data and for checking whether or not said appearance rate is less than a predetermined threshold value, said appearance rate monitor deciding said region motion vectors as reliable motion vectors only when said appearance rate is less than said threshold value.

21. A video analysis device as claimed in claim 18, wherein said peak detecting means comprises:
   a peak detector responsive to said region data, said histogram, and said region motion vectors for detecting said region motion vector in said histogram and to detect said region motion vectors; and
   an appearance rate monitor responsive to said region data and said region motion vectors for measuring an appearance rate of the region motion vectors in each region datum to said region motion vectors in all said region data and for checking whether or not said appearance rate is less than a predetermined threshold value, said appearance monitor deciding said region motion vectors as reliable motion vectors only when said appearance rate is less than said threshold value.

22. A video analysis device as claimed in claim 20, wherein said establishing means comprises:
   region estimating means responsive to said region data and said reliable motion vectors for estimating an estimated datum based on each region datum of said first key frame and one of said reliable motion vectors that is decided for the last-mentioned each region datum; and
   region matching means responsive to the region data of said second key frame and said estimated datum for detecting said moving object by region matching said estimated datum with the region data of said second key frame.

23. A video analysis device as claimed in claim 22, wherein said separating means measures a color histogram change and a frame difference between each pair of consecutive frame images of said succession and picks up as each of said key frames from said frame images of the succession one of said each pair of consecutive frame images for which at least one of said color histogram change and said frame difference is greater than a prescribed threshold value.

24. A video analysis device as claimed in claim 19, wherein said correspondence establishing means comprises:
   region estimating means responsive to said region data and said region motion vectors for estimating an estimated datum based on each region datum of said first key frame and one of said region motion vectors that is detected for the last-mentioned each region datum; and
   region matching means responsive to the region data of said second key frame and said estimated datum for detecting said moving object by region matching said estimated datum with the region data of said second key frame.

25. A video analysis device as claimed in claim 24, wherein said separating means measures a color histogram change and a frame difference between each pair of consecutive frame images of said succession and picks up as each of said key frames from said frame images of the succession one of said each pair of consecutive frame images for which at least one of said color histogram change and said frame difference is greater than a prescribed threshold value.

26. A video analysis device as claimed in claim 9, wherein:

said region motion vector detecting means detects a plurality of region motion vectors, each in response to said region data, said reliable blocks, and said block motion vectors;

said correspondence establishing means comprising:

region estimating means responsive to said region data and said region motion vectors for estimating an estimated datum based on each region datum of said first key frame and one of said region motion vectors that is detected for the last-mentioned each region datum; and region matching means responsive to the region data of said second key frame and said estimated datum for detecting said moving object by region matching said estimated datum with the region data of said second key frame.

27. A video analysis device as claimed in claim 26, wherein said separating means measures a color histogram change and a frame difference between each pair of consecutive frame images of said succession and picks up as each of said key frames from said frame images of the succession one of said each pair of consecutive frame images for which at least one of said color histogram change and said frame difference is greater than a prescribed threshold value.

28. A video analysis device as claimed in claim 5, wherein:

said detecting means detects said region motion vector for each region datum and a plurality of region motion vectors for said region data, respectively;

said correspondence establishing means comprising:

region estimating means responsive to said region data and said region motion vectors for estimating an estimated datum based on each region datum of said first key frame and one of said region motion vectors that is detected for the last-mentioned each region datum; and region matching means responsive to the region data of said second key frame and said estimated datum for detecting said moving object by region matching said estimated datum with the region data of said second key frame.

29. A video analysis device as claimed in claim 28, wherein said separating means measures a color histogram change and a frame difference between each pair of consecutive frame images of said succession and picks up from said frame images of the succession as each of said key frames one of said each pair of consecutive frame images for which at least one of said color histogram change and said frame difference is greater than a prescribed threshold value.

\* \* \* \* \*